US011665779B2

United States Patent
Zhang et al.

(10) Patent No.: US 11,665,779 B2
(45) Date of Patent: May 30, 2023

(54) MANAGING SLOT FORMAT BASED ON DUPLEX MODE SWITCHING

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 17/327,012

(22) Filed: May 21, 2021

(65) Prior Publication Data
US 2022/0377843 A1  Nov. 24, 2022

(51) Int. Cl.
*H04W 88/06* (2009.01)
*H04L 5/16* (2006.01)
*H04W 72/04* (2023.01)
*H04W 72/044* (2023.01)

(52) U.S. Cl.
CPC .............. *H04W 88/06* (2013.01); *H04L 5/16* (2013.01); *H04W 72/044* (2013.01)

(58) Field of Classification Search
CPC ......... H04L 5/14; H04L 1/1642; H01Q 21/28; H04B 1/54; H04B 1/56; H04B 7/0404; H04B 7/0691; H04W 72/0446; H04W 24/02; H04W 88/06
See application file for complete search history.

(56) References Cited

U.S. PATENT DOCUMENTS

| | | |
|---|---|---|
| 2009/0296609 A1 | 12/2009 | Choi et al. |
| 2012/0207038 A1 | 8/2012 | Choi et al. |
| 2018/0269919 A1* | 9/2018 | Gharavi .................. H04B 7/10 |
| 2021/0112429 A1 | 4/2021 | Raghavan et al. |

(Continued)

FOREIGN PATENT DOCUMENTS

| | | |
|---|---|---|
| WO | 2020249229 A1 | 12/2020 |
| WO | WO-2022008788 A1 * | 1/2022 |

OTHER PUBLICATIONS

International Search Report and Written Opinion—PCT/US2022/026210—ISA/EPO—dated Jul. 8, 2022.

*Primary Examiner* — Awet Haile
(74) *Attorney, Agent, or Firm* — Procopio, Cory, Hargreaves & Savitch LLP/Qualcomm Incorporated

(57) ABSTRACT

The base station may transmit a mode switch indication to a UE to switch from a first duplex mode to a second duplex mode. The UE may activate or deactivate one or more antenna panels and the UE and the base station may communicate with each other based on the mode switch indication. The second duplex mode may be FD mode, and the mode switch indication may be transmitted a threshold number of symbols or slots prior to the FD symbols. The slot format pattern may not include FD symbol, and the base station and the UE may communicate bidirectional signals in FD mode using the flexible symbols. The second duplex mode may be HD mode. The slot format pattern may include the FD symbols, and the base station and the UE may transmit or receive signals in HD mode using the FD symbols as the flexible symbols.

41 Claims, 16 Drawing Sheets

(56) References Cited

U.S. PATENT DOCUMENTS

| | | | |
|---|---|---|---|
| 2022/0007405 A1* | 1/2022 | Takeda | H04W 72/1263 |
| 2022/0182160 A1* | 6/2022 | Su | H04L 5/14 |
| 2022/0239352 A1* | 7/2022 | Hakola | H04B 7/061 |
| 2022/0239457 A1* | 7/2022 | Ozozlu | H04L 1/1642 |

* cited by examiner

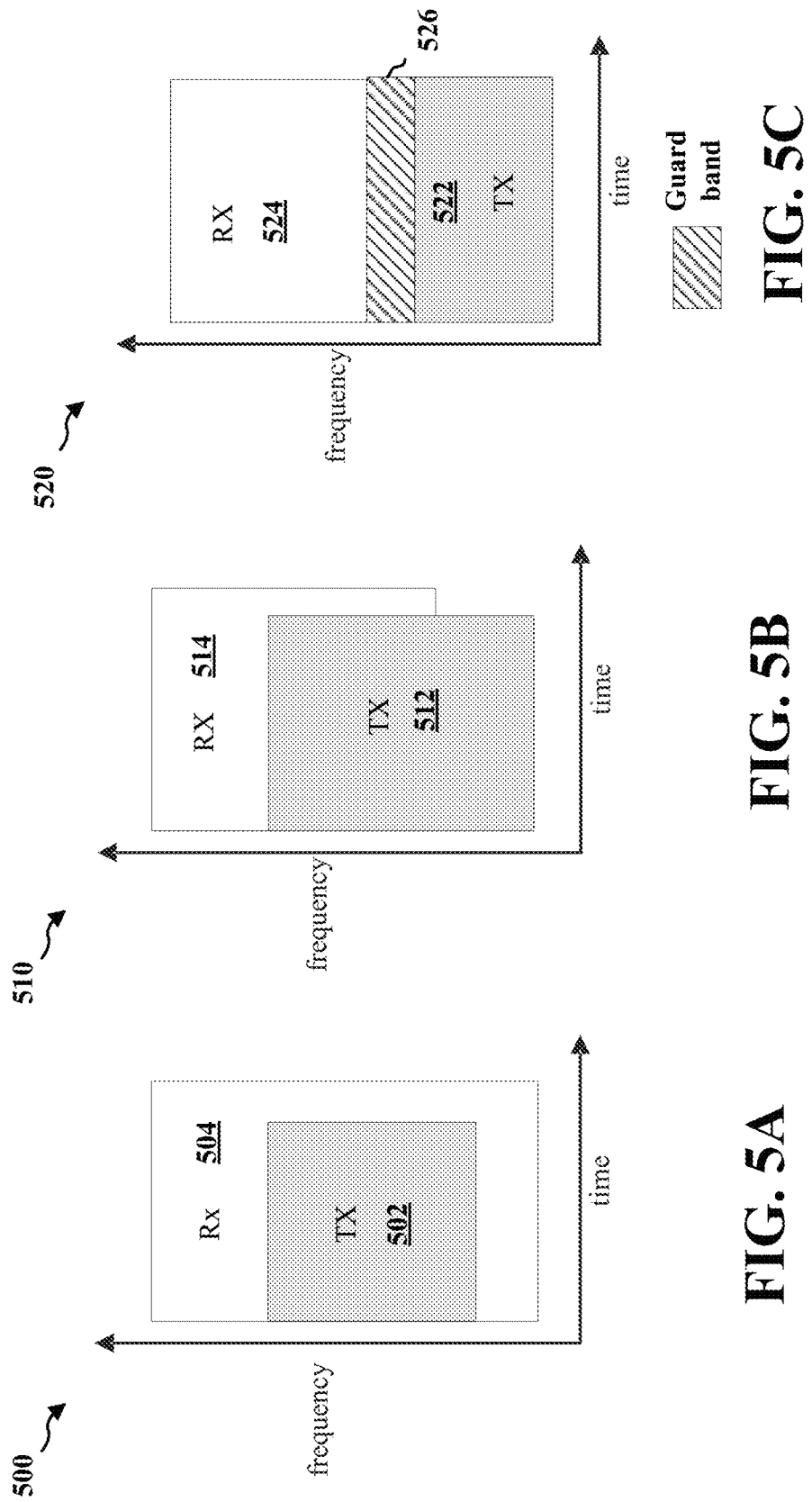

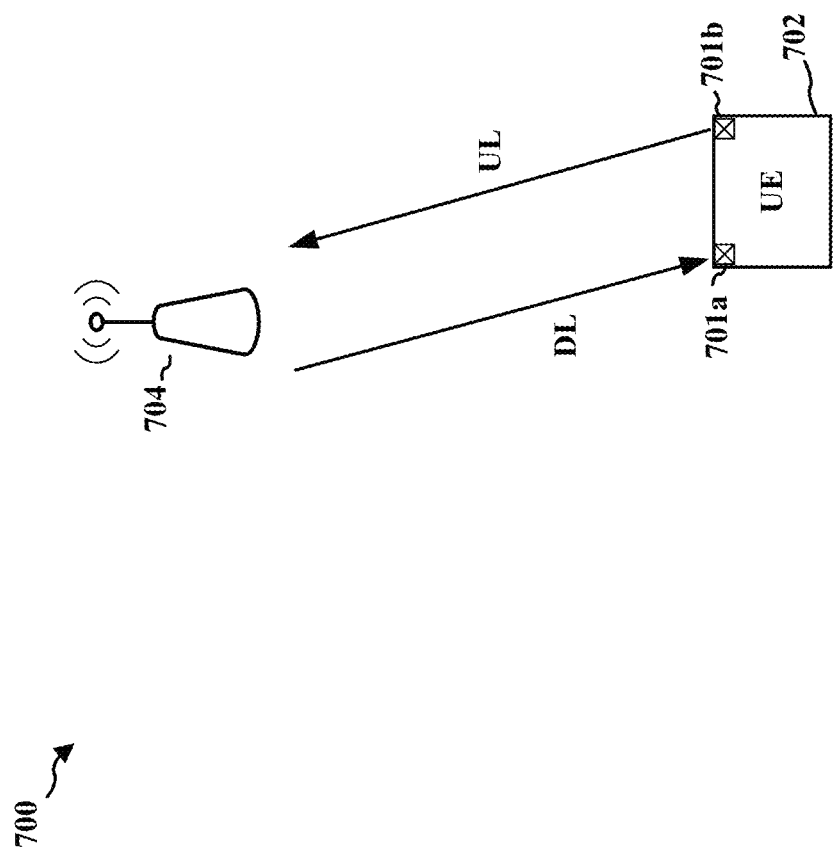

MANAGING SLOT FORMAT BASED ON DUPLEX MODE SWITCHING

INTRODUCTION

The present disclosure relates generally to communication systems, and more particularly, to a method of wireless communication including duplex mode switching.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus for wireless communication at a user equipment (UE) is provided. The apparatus for wireless communication at a UE, including a memory, and at least one processor coupled to the memory, the at least one processor and the memory configured to receive, from a base station, a mode switch indication to switch from a first duplex mode to a second duplex mode, and communicate with the base station via one or more antenna panels in the second duplex mode based on the mode switch indication.

In an aspect of the disclosure, a method of wireless communication at the UE is provided. The method of wireless communication at a UE, including receiving, from a base station, a mode switch indication to switch from a first duplex mode to a second duplex mode, and communicating with the base station via one or more antenna panels in the second duplex mode based on the mode switch indication.

In an aspect of the disclosure, an apparatus for wireless communication at the UE is provided. The apparatus for wireless communication at a UE, including means for receiving, from a base station, a mode switch indication to switch from a first duplex mode to a second duplex mode, and means for communicating with the base station via one or more antenna panels in the second duplex mode based on the mode switch indication.

In an aspect of the disclosure, a non-transitory computer-readable storage medium, is provided. The computer-readable medium storing computer executable code at a UE, the code when executed by a processor causes the processor to receive, from a base station, a mode switch indication to switch from a first duplex mode to a second duplex mode, and communicate with the base station via one or more antenna panels in the second duplex mode based on the mode switch indication.

In an aspect of the disclosure, an apparatus for wireless communication at a base station is provided. The apparatus for wireless communication at a base station, including a memory, and at least one processor coupled to the memory, the at least one processor and the memory configured to transmit, to a UE, a mode switch indication to switch from a first duplex mode to a second duplex mode, and communicate with the UE via one or more antenna panels in the second duplex mode based on the mode switch indication.

In an aspect of the disclosure, a method of wireless communication at the base station is provided. The method of wireless communication at a base station, including transmitting, to a UE, a mode switch indication to switch from a first duplex mode to a second duplex mode, and communicating with the UE via one or more antenna panels in the second duplex mode based on the mode switch indication.

In an aspect of the disclosure, an apparatus for wireless communication at the base station is provided. The apparatus for wireless communication at a base station, including means for transmitting, to a UE, a mode switch indication to switch from a first duplex mode to a second duplex mode, and means for communicating with the UE via one or more antenna panels in the second duplex mode based on the mode switch indication.

In an aspect of the disclosure, a non-transitory computer-readable storage medium, is provided. The computer-readable medium storing computer executable code at a base station, the code when executed by a processor causes the processor to transmit, to a UE, a mode switch indication to switch from a first duplex mode to a second duplex mode, and communicate with the UE via one or more antenna panels in the second duplex mode based on the mode switch indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A, 5B, and 5C illustrate examples of FD resources.

FIG. 7 is illustrating activation/deactivation of antenna panels of a method of wireless communication.

DETAILED DESCRIPTION

Figure 1:
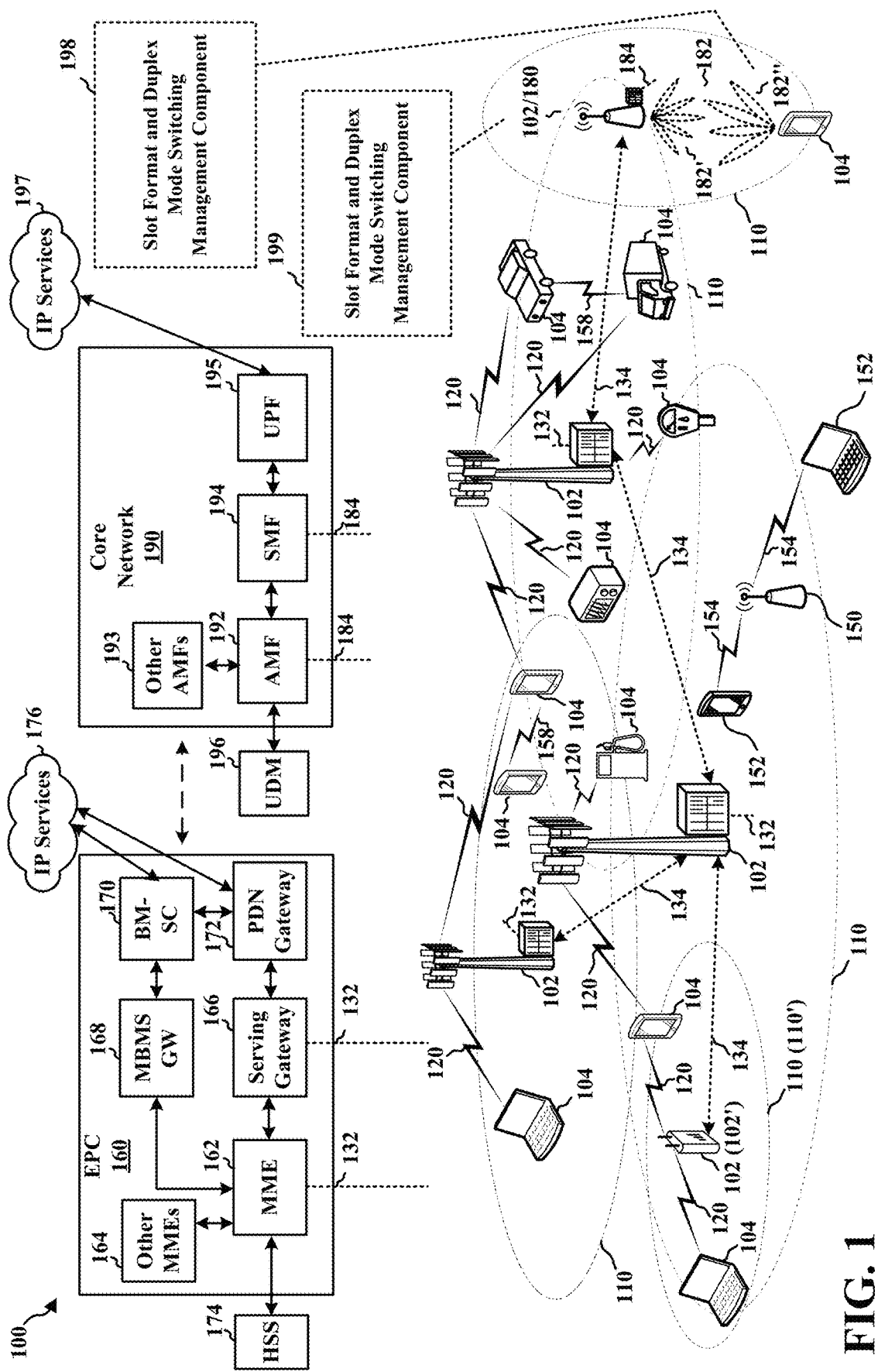
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

In a full-duplex (FD) mode, a user equipment (UE) transmits and receives in a same frequency range, or a frequency range that is close enough to cause self-interference, at overlapping times. In a half-duplex (HD) mode, the UE transmits and receives at different times. Aspects presented herein enable a UE to handle duplex mode switching with or without a slot format update. The base station may indicate to the UE to switch the duplex mode for the UE, and the UE may activate or deactivate an antenna panel or antenna component based on the indication.

In some aspects presented herein, the base station may indicate to the UE to switch between duplex modes without a corresponding slot format update information. In some aspects, the indication for the UE to switch between duplex modes may be an antenna activation or deactivation indication. That is, the base station may transmit an antenna activation or deactivation indication to the UE instructing the UE to switch the duplex mode accordingly. In one aspect, the base station may indicate to the UE to switch the duplex mode from a HD mode to a FD mode, and the base station may transmit the mode switch indication at a time prior to switching that gives the UE enough time to activate the additional antenna panels. If the UE's current slot format does not include FD symbols, the base station and the UE may use flexible symbols of the slot format to transmit bidirectional signals in the FD mode. In another aspect, the mode switch indication may indicate to the UE to switch the duplex mode from FD mode to HD mode, and the UE may use FD symbols of a slot format pattern as flexible symbols to transmit signals in HD mode.

Aspects presented herein may also provide improved power management for the UE by enabling the UE to deactivate one or more antenna panels based on a mode switch indication, while also enabling the UE to prepare for FD communication by activating one or more antenna panels in response to a mode switch indication. The mode switch indication may include a time window to switch the duplex mode. If the mode switch indication instructs the UE to switch the duplex mode from HD mode to FD mode for the time window, the UE may deactivate an antenna panel for the time window if a length of the time window is greater than or equal to a threshold value.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antenna panels, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a slot format and duplex mode switching management component 198 configured to receive, from a base station, a mode switch indication to switch from a first duplex mode to a second duplex mode, and communicate with the base station via one or more antenna panels in the second duplex mode based on the mode switch indication. In certain aspects, the base station 180 may include a slot format and duplex mode switching management component 199 configured to transmit, to a UE, a mode switch indication to switch from a first duplex mode to a second duplex mode, and communicate with the UE via one or more antenna panels in the second duplex mode based on the mode switch indication. Although the following description may be focused on 5G NR, the concepts described herein may be applicable to other similar areas, such as LTE, LTE-A, CDMA, GSM, and other wireless technologies.

Figure 2:
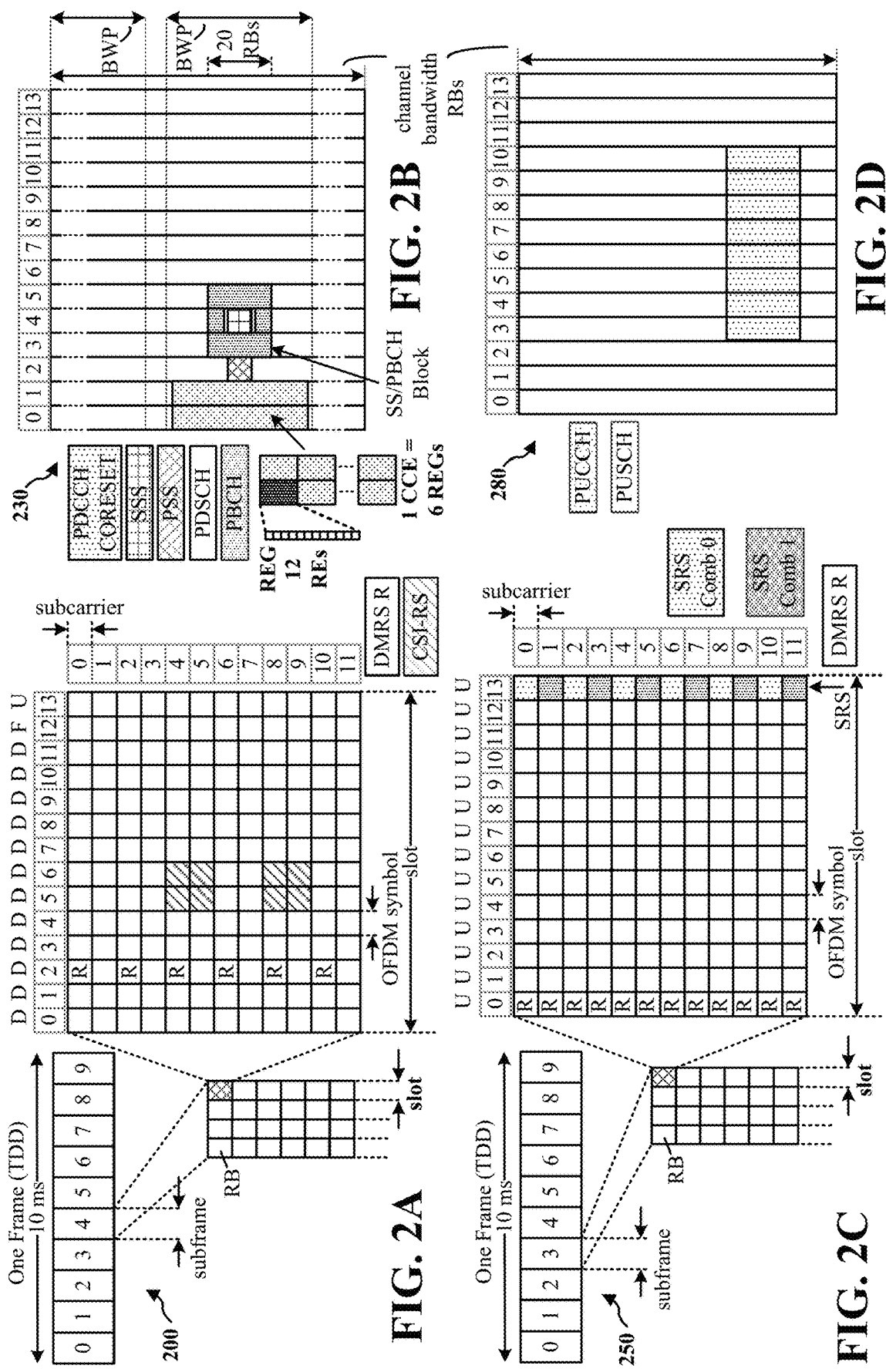
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling or message) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
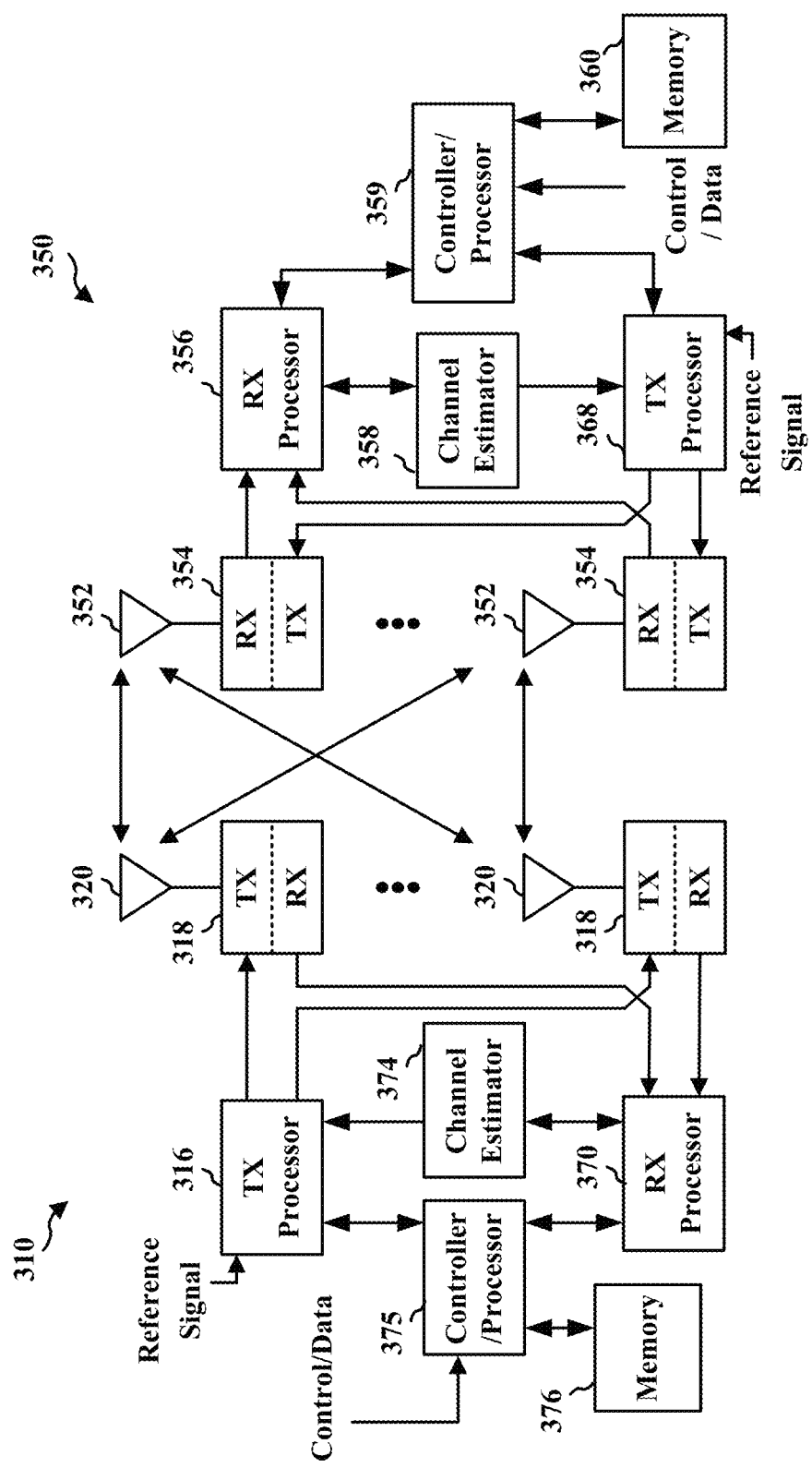
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

In some aspects, at least one base station and one or more UE may support various duplex modes of communications, including a full-duplex (FD) mode and a half-duplex (HD) mode. FD mode may refer to simultaneous communications of one or more uplink (UL) transmissions or one or more downlink (DL) communications at a base station or a UE that may be associated with various aspects of procedures within the same frequency, different frequency sub-bands, or partially overlap in the frequency domain. HD mode may support transmission or reception of information in one direction at a time without overlapping uplink and downlink communication.

In FD mode, at least one base station and one or more UEs may simultaneously (e.g., overlapping at least partially in time) transmit and receive UL/DL communications. In one example, a base station in FD mode and a UE in FD mode may simultaneously transmit and receive UL/DL communications. That is, the base station may send a DL transmission to the UE simultaneously with the UE sending an UL transmission to the base station. In another example, a base station in FD mode may simultaneously transmit and receive UL/DL communications to and from multiple UEs. That is, the base station may send a DL transmission to a first UE simultaneously with receiving an UL transmission from a second UE. In yet another example, a UE in FD mode may receive a DL transmission from a first base station simultaneously with sending an UL transmission to a second base station. That is, the UE in FD mode may receive a DL transmission from a first base simultaneously with sending an UL transmission to a second base station. In some aspects, the base station may be a TRP or an integrated access and backhaul (IAB) node of an IAB network.

An IAB network may include at least one IAB donor, i.e., an anchor node, and one or more IAB nodes, and the IAB nodes may exchange communication with other IAB nodes, with a base station, and/or with one or more UEs. The IAB donor may be connected to the core network via a wireline backhaul link, and the IAB nodes may be connected to the IAB donor via backhaul links. One or more UEs may be connected to the IAB donor or one or more IAB nodes via respective access links.

In one aspect, one or more IAB nodes may simultaneously communicate with each other. That is, one IAB node may simultaneously communicate the transmission and reception of data with another IAB node. One IAB node may also simultaneously communicate transmission and/or reception of data with a first IAB node and communicate transmission and/or reception of data with a second IAB node. In another aspect, one or more IAB nodes and one or more UEs may communicate UL transmission and DL transmission. For example, one IAB node may simultaneously communicate UL transmission and DL transmission with one UE. In another example, one IAB node may simultaneously communicate an UL transmission with a first UE and a DL transmission with a second UE. In yet another example, a first IAB node may communicate an UL transmission with a UE simultaneously with a second IAB node communicating a DL transmission with the UE.

The FD capability may be present at the base station or the UEs. That is, at least one of the base station or the UE may have the capability to support FD mode communication. For example, a UE may have multiple panels facing different directions, e.g., two antenna panels facing the front and two antenna panels facing the back of the UE, and the front-facing antenna panels may be configured to transmit/receive beams different from the beams transmitted/received via the rear-facing antenna panels. Accordingly, the UE may have the capability to support UL transmission from one antenna panel and DL reception in another antenna panel simultaneously. For another example, a base station may have the capability to support UL reception through forming a first beam at a first set of antenna panels and support DL transmission through forming a second beam at a second set of antenna panels simultaneously.

In some aspects, the FD capability of a the one or more UEs or the base stations, may be conditional on various factors, such as interference, beam separation, antenna separation, isolation, etc. In one aspect, the one or more UEs or the base stations may support FD mode communication based on a capability to perform beam separation. For example, the base station may determine that a UE may support FD mode communication based on the capability of the UE to separate the UL beam and the DL beam. In another aspect, the one or more UEs or the base stations may support FD mode communication based on self-interference between the DL and/or UL transmissions. That is, the self-interference caused by the simultaneous transmission of the DL/UL signals may impede the UE's capacity to support FD mode communication. In yet another aspect, a clutter echo caused by reflections of the radio signals at surfaces or obstructions may affect the UE's capacity to support FD mode communication.

FD mode communication may reduce the network latency and increase spectral efficiency through the exchange of uplink and downlink communication at overlapping times and in a same frequency band. For example, a UE or a base station may receive a signal in without waiting until the end of a transmission, which may reduce latency. FD communication may also enable an increase in spectrum efficiency, which refers to the information rate that can be exchanged over a given spectrum or bandwidth, and improve the efficiency of the resource utilization. A base station may operate in a FD mode, which may enable an increase in spectral efficiency per cell. Individual UEs may operate in a FD mode, which may enable an increase in spectral efficiency per UE.

Figure 4A:
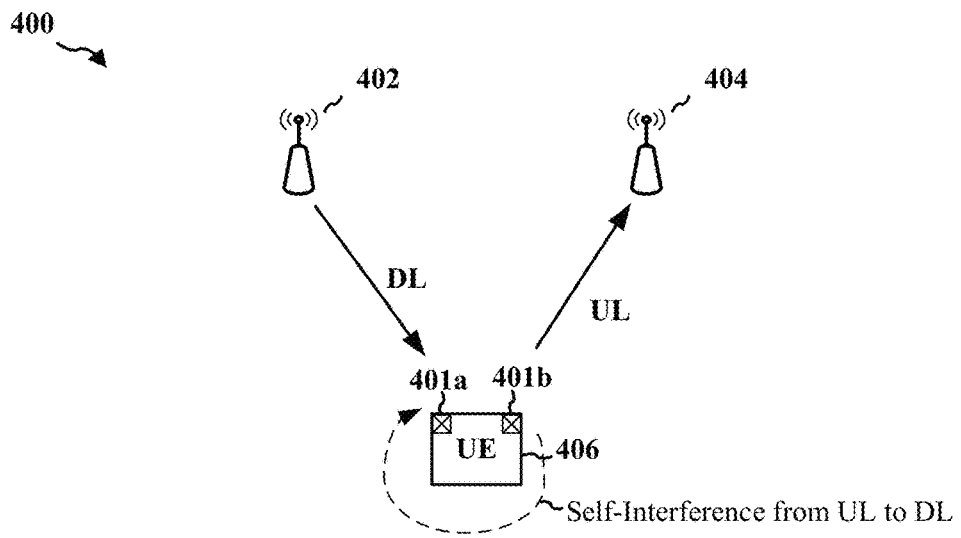
FIGS. 4A, 4B, and 4C are examples of different types of full-duplex (FD) mode of wireless communications.
Figure 4B:
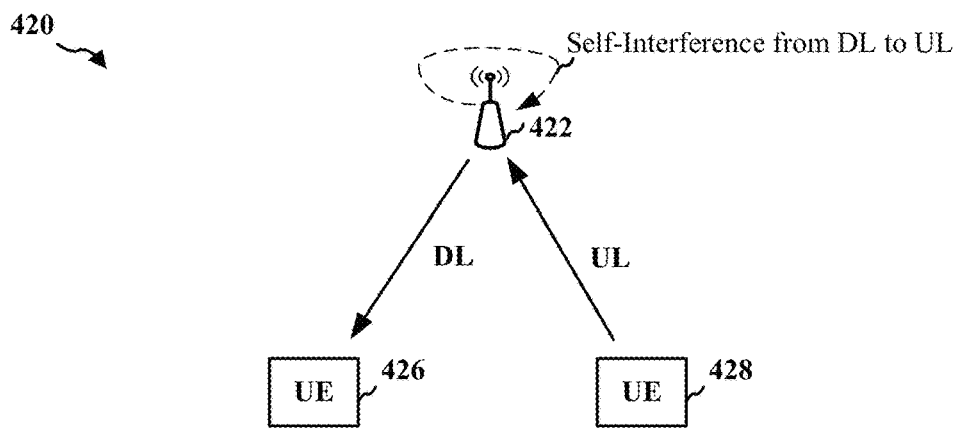
Figure 4C:
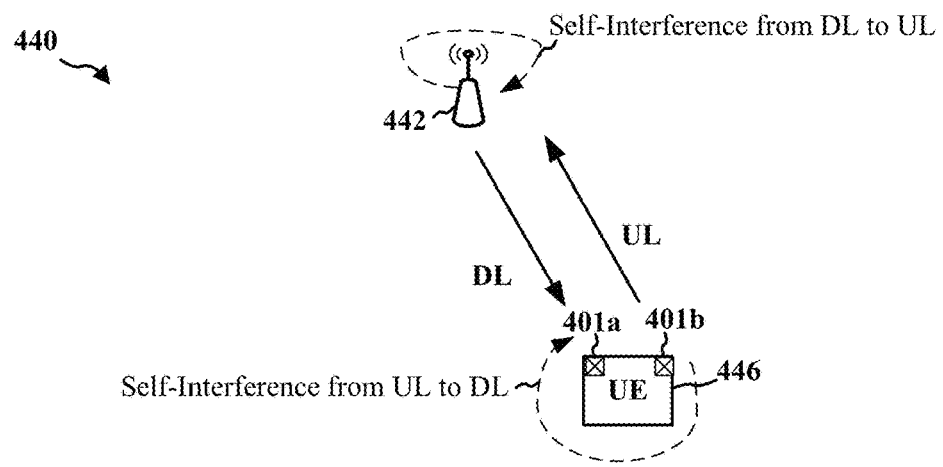

FIGS. 4A, 4B, and 4C are examples 400, 420, and 440 of different types of FD mode of wireless communications. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information. The first example 400 illustrates a first base station 402 and a second base station 404, and a UE 406 in FD mode. The first base station 402 and the second base station 404 may be in FD mode or a HD mode. The UE 406 may have the FD capability to simultaneously communicate UL/DL transmissions with the first base station 402 and the second base station 404. For example, the UE 406 may receive the DL transmission from the first base station 402 and transmit a UL transmission to the second base station 404 simultaneously. The UE 406 may receive the DL transmission from the first base station 402 via a first antenna panel 401a and send the UL transmissions to the second base station 404 via a second antenna panel 401b. Here, the first base station 402 may be a first TRP 402, and the second base station 404 may be a second TRP 404. The UE 406 may experience self-interference as a result of receiving at least a portion of the uplink signal when receiving the downlink signal, e.g., the UE's uplink signal to the second base station 404 may leak to (e.g., be received by) the UE's receiver when the UE 406 is attempting to receive the signal from the other base station, such as the first base station 402. The UE 406 may experience additional interference due to signals from other devices.

The second example 420 illustrates a base station 422 operating in a FD mode with a first UE 426 and a second UE 428. In one aspect, the base station 422 in FD mode may simultaneously (e.g., at least partially overlapping in time) receive UL signals from the UE 428 while transmitting DL transmissions to the UE 426 in a FD mode. The first UE 426 and the second UE 428 may also operate in a FD mode or may operate in a HD mode. For example, the base station 422 may transmit a DL transmission to the first UE 426 and receive the UL transmission from the second UE 428 simultaneously. The base station 422 may transmit the DL transmission to the first UE 426 via a DL beam and receive the UL transmissions from the second UE 428 via the UL beam. The base station 422 may experience self-interference as a result of receiving at least a portion of the downlink signal when receiving the uplink signal, e.g., the base station's downlink signal to UE 426 may leak to (e.g., be received by) the base station's receiver when the base station 422 is attempting to receive the signal from the other UE 428. The base station 422 may experience additional interference due to signals from other devices.

The third example 440 illustrates a base station 442 in FD mode and a UE 446 in FD mode. In one aspect, the base station 442 in FD mode may simultaneously (e.g., at least partially overlapping in time) receive uplink transmissions while transmitting downlink transmissions with the UE 446. In one aspect, the base station 442 and the UE 446 may support FD mode. For example, the base station 442 may transmit a DL transmission to the UE 446 and receive the UL transmission from the UE 446 simultaneously. For example, the base station 442 may transmit the DL transmission to the UE 446 via a DL beam and receive the UL transmissions from the UE 446 via the UL beam. The base station 442 and/or the UE 446 may experience self-interference, e.g., as described in connection with the examples in FIGS. 4A and 4B.

FIGS. 5A-5B illustrate a first example 500 and a second example 510 of in-band full-duplex (IBFD) resources. FIG. 5C illustrates an example 520 of sub-band full-duplex resources. In IBFD, signals may be transmitted and received in overlapping times and overlapping in frequency. As shown in the first example 500, a time and a frequency allocation of transmission resources 502 may fully overlap with a time and a frequency allocation of reception resources 504. In the second example 510, a time and a frequency allocation of transmission resources 512 may partially overlap with a time and a frequency of allocation of reception resources 514.

IBFD is in contrast to sub-band FDD, where transmission and reception resources may overlap in time using different frequencies, as shown in FIG. 5C. As shown in FIG. 5C, the transmission resources 522 are separated from the reception resources 524 by a guard band 526. The guard band may be frequency resources, or a gap in frequency resources, provided between the transmission resources 522 and the reception resources 524. Separating the transmission frequency resources and the reception frequency resources with a guard band may help to reduce self-interference. Transmission resources and a reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a UE or a device implementing UE functionality, the transmission resources 502, 512, and 522 may correspond to uplink resources, and the reception resources 504, 514, and 524 may correspond to downlink resources. Alternately, if the full-duplex operation is for a base station or a device implementing base station functionality, the transmission resources 502, 512, and 522 may correspond to downlink resources, and the reception resources 504, 514, and 524 may correspond to uplink resources.

Figure 6:
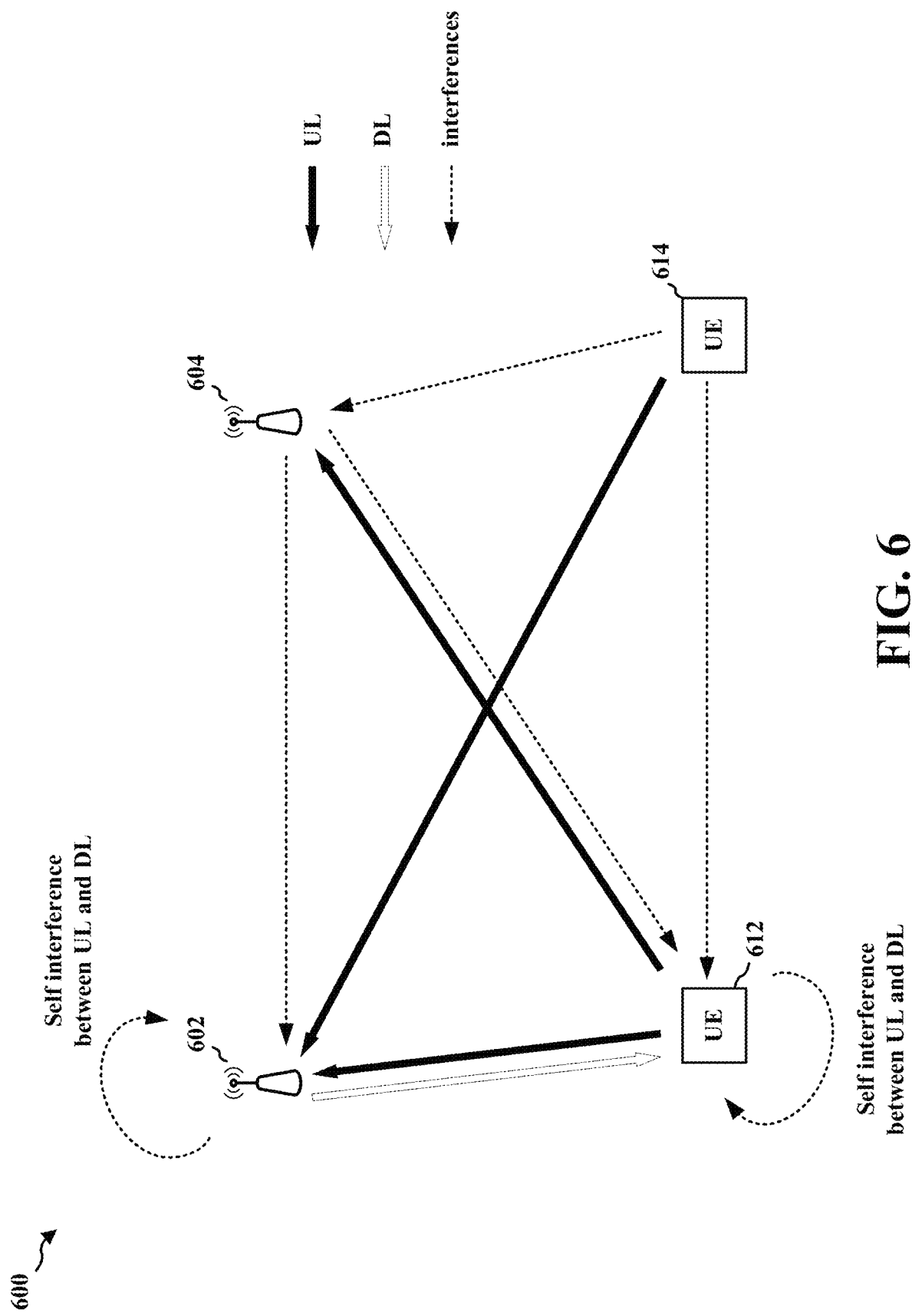
FIG. 6 illustrates an example of interference in different aspects of FD mode of wireless communication.

FIG. 6 illustrates an example 600 of potential interference in different aspects of FD wireless communication. FIG. 6 includes a first base station 602, a second base station 604, a first UE 612, and a second UE 614. Here, the first base station 602 and the second base station 604 may be a first TRP 602 and a second TRP 604.

In some aspects, the first base station 602 and the first UE 612 may operate in a FD mode. The first base station 602 and the first UE 612 operating in FD mode may experience various types of interference including interference based on the duplex mode and/or the data transmissions from the second base station 604 and the second UE 614. In one example, the first base station 602 operating in the FD mode may experience self-interference when receiving the UL due to the DL transmission at the first base station 602 and may also experience interference from the signal transmitted by the second UE 614. In another example, the first UE 612 operating in the FD mode may experience self-interference due to its transmission of the UL when receiving DL signals at the first UE 612. The UE 612 may also experience interference from the signal transmitted by the second base station 604 and the interference from the signal transmitted by the second UE 614.

In one aspect, the first base station 602 and the second base station 604 may operate in the HD mode, and the first UE 612 may operate in the FD mode. For example, the first base station 602 and the second base station 604 may operate in the HD mode and the first UE 612 may operate in the FD mode, e.g., as described in connection with the first example 400 illustrated in FIG. 4A, including the first base station 402 and the second base station 404 in the HD mode and the UE 406 in the FD mode. The first base station 602 may be a first TRP 602, and the second base station 604 may be a second TRP 604.

The first UE 612 operating in the FD mode may receive the DL signal from the first base station 602 and transmit the UL signal to the second base station 604. The first UE 612 in FD mode may experience self-interference, in which a signal transmitted from the first UE 612 may affect reception at the first UE 612. The UL signal transmitted to the second base station 604 may cause the self-interference to the DL signal received from the first base station 602. The first UE 612 may also experience interference from a signal transmitted by the second base station 604 and/or a signal transmitted by the second UE 614.

In another aspect, the first base station 602 may operate in FD mode, and the first UE 612 and the second UE 614 may operate in HD mode, e.g., as described in connection with the second example 420 illustrated in FIG. 4B, including the base station 422 in FD mode and the first UE 426 and the second UE 428 in HD mode.

The first base station 602 operating in FD mode may transmit the DL signal to the first UE 612 and receive the UL signal from the second UE 614. The first base station 602 in FD mode may experience a self-interference, in which a signal transmitted from the first base station 602 may affect reception at the first base station 602. That is, the DL signal transmitted to the first UE 612 may cause self-interference for reception of the UL signal received from the second UE 614 and/or the UL signal received from the second UE 614 for the first base station 602. The first base station 602 may also experience interference from a signal transmitted by the second base station 604.

In another aspect, the first base station 602 may operate in FD mode, and the first UE 612 may operate in FD mode, e.g., as described in connection with the third example 440 illustrated in FIG. 4C, including the base station 442 in FD mode and the UE 446 in FD mode.

The first base station 602 operating in FD mode may transmit the DL signal to the first UE 612 and receive the UL signal from the first UE 612. The first base station 602 in FD mode may experience self-interference. That is, the DL signal transmitted to the first UE 612 and the UL signal received from the first UE 612 may cause the self-interference to the DL signal transmitted to the first UE 612 and the UL signal received from the first UE 612 for the first base station 602. The first base station 602 may also experience interference from a signal transmitted by the first base station 602.

A UE that supports FD mode may only operate in a FD mode some of the time. The base station may configure the UE, or otherwise indicate to the UE, to use a particular the duplex mode to communicate with the base station. That is, the base station may indicate to the UE to transmit and receive communication with the base station in a FD mode or may indicate the UE to communicate with the base station in a HD mode. The base station may indicate to the UE to switch between duplex modes, e.g., between the HD mode and the FD mode. To accommodate the switch in the duplex mode between a HD mode and a FD mode, the base station may update the slot format for the UE. That is, the base station may transmit a slot format pattern update to provide the UE with the slot format for the base station and the UE to communicate in the changed duplex mode. The slot format may indicate how each of the symbols within a single slot may be used, and the slot format may specify how each of the symbols within a single slot may be used based on the duplex mode. In one aspect, the base station may transmit the RRC message including a common slot configuration, e.g., tdd-UL-DL-ConfigurationCommon, or a UE-specific slot configuration, e.g., tdd-UL-DL-ConfigurationDedicated, to indicate the slot format or configuration for communicating in a certain duplex mode. In another aspect, the base station may transmit the DCI format 2_0 including field value, e.g., SFI-index, indicating a slot format. Table 1 illustrates an example of different slot format patterns. A pattern indicates, for each symbol of a slot, whether the symbol is to be used for downlink reception (D), uplink transmission (U), or flexible (F). The flexible symbols may be used for downlink reception or uplink transmission. In some aspects, as described herein, the UE may use the flexible symbols for downlink reception and uplink transmission, e.g., in an FD mode. In some aspects, a slot format pattern may include a designation of one or more symbols as FD symbols, e.g., bi-directional FD symbols. Table 1 illustrates an example in which slot format pattern Z indicates FD symbols for FD communication. The aspects presented herein are not limited to the example slot format patterns in Table 1 and may be applied in connection with additional slot format patterns. The pattern Z is merely one example of a slot pattern format with FD symbols. Various patterns with FD symbols may be used in connection with the aspects of the present application.

TABLE 1

| Format | \multicolumn{14}{c}{Symbol number in a slot} |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | F | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | F | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | F | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | F | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | \multicolumn{14}{c}{Reserved} |
| 255 | \multicolumn{14}{c}{UE determines the slot format for the slot based on tdd-UL-DL-ConfigurationCommon, or tdd-UL-DL-ConfigurationDedicated and, if any, on detected DCI formats} |
| Z | D | D | FD | FD | FD | U | U | U | D | D | D | D | D | D |

In some aspects, the base station may indicate the duplex mode switching to the UE with no update in the slot format. The base station may transmit the indication of the duplex mode switching via at least one of radio resource control (RRC) message, medium access control-control element (MAC-CE), or downlink control information (DCI). The base station may provide an explicit duplex mode switch indication or a panel activation/deactivation indication without sending an indication for the UE to use a different slot format pattern, e.g., without an update via tdd-UL-DL-ConfigurationCommon, tdd-UL-DL-ConfigurationDedicated, or SFI-index. In one example, the base station may instruct the UE, operating in a HD mode, of an FD scheduling (or bidirectional scheduling) after 100 ms, which may indicate to the UE to switch the duplex mode from HD to FD after 100 ms. In another example, the base station may instruct the UE to activate a new antenna, which may indicate to the UE to switch to FD mode. In yet another example, the base station may instruct the UE to deactivate one of the active antenna panels, which may indicate to the UE to switch to HD mode.

The mode switching indication transmitted to the UE may instruct the UE to prepare for the duplex mode communication. In one aspect, the UE operating in HD mode may have one activated antenna panel for both DL transmission and UL transmission, i.e., based on beam reciprocity. In response to receiving the indication of the FD scheduling from the base station, the UE may change the operation from HD mode to FD mode. The UE may use preparation time to change the antenna configuration from HD mode to FD mode. For example, the UE may use preparation time to activate a second panel for FD transmissions before the scheduled FD transmission/reception.

In one aspect, the existing slot format pattern based on the common slot format pattern or the UE-specific slot format pattern may not include any bidirectional (BD) FD (BD FD) symbol. In case the existing slot format pattern does not include the BD FD symbol, the UE and the base station may determine to operate in a FD mode to exchange FD communication using the flexible symbols (F symbols) of the existing slot format pattern, e.g., during flexible symbols of the pattern, which may be applied to all BWPs per cell. The flexible symbols may be dynamically indicated for TDD HD mode or FD mode by the scheduling information in the DCI. In case of switching from the HD mode to the FD mode, the base station may transmit the switching mode indication explicitly to the UE, e.g., X symbols/ms prior to the flexible symbol for BD FD symbol, and the UE may be ready to operate in FD mode. Although the indication is referred to as a switching mode indication to illustrate the concept of the indication, the indication may also be referred to by other names, such as a panel activation/deactivation indication, etc. The number of X symbols may be determined based on the time that the UE may use to prepare for a different duplex mode, e.g., activating a new antenna panel, before operating in FD mode.

In another aspect, the base station may transmit a configuration of the slot format pattern including one or more BD FD symbols. The UE may have been previously configured to use a slot format pattern that did not include a BD FD symbol. If the base station configures the UE, or otherwise indicates to the UE, to use a slot format pattern having one or more BD FD symbols (e.g., symbols designated for FD communication), the configuration may be considered an implicit indication to switch to a FD mode. In table 1, pattern Z includes multiple FD symbols. That is, the base station may transmit the configuration of the slot format pattern with one or more BD FD symbols to the UE, and the UE may prepare to receive FD scheduling from the base station and communicate with the base station in the FD mode based on the configured slot format pattern. The UE may prepare for operating in the FD mode, e.g., X symbols/ms prior to the BD FD symbol. Accordingly, the base station and the UE may transmit/receive in the FD mode during the BD FD symbols of the existing slot format pattern, based on the mode switch indication to FD mode. The number of X symbols may be determined based on the time that the UE may need to prepare certain configurations, e.g., activating a new antenna panel, before operating in FD mode. If the base station configures the UE with a subsequent slot format pattern that does not include a BD FD symbol, the UE may respond by switching to a HD mode, e.g., deactivating one or more antenna panels or antenna components. In one aspect, the one or more antenna panel may include the antenna 320 in FIG. 3.

In another aspect, the current slot format pattern, which may be based on the common slot format pattern or the UE-specific slot format pattern, may include one or more BD FD symbols, and the base station may indicate the UE to switch the duplex mode from FD mode to HD mode. In case the existing slot format pattern includes the BD FD symbol, the UE and the base station may treat the BD FD symbols as the flexible symbols for HD mode and transmit or receive signals in HD mode using the BD FD symbols of the existing slot format pattern as the flexible symbol.

In some aspects, the mode switching indication from a first duplex mode to a second duplex mode, i.e., from HD mode to FD mode or from FD mode to HD mode, may include a time window for operating in the second duplex mode. That is, the mode switching indication may include the time window for the base station and the UE to operate in the second duplex mode, and the base station and the UE may revert to operating in the first duplex mode after the time window. For example, the base station may send an antenna panel activation indication to the UE for 100 ms, the base station and the UE may operate in FD mode for the 100 ms of time window and revert to operating in HD mode. In one aspect, the mode switching indication may not include a time window, and the base station and the UE may operate in the second duplex mode until receiving another mode switching indication.

In some aspects, the mode switching indication from FD mode to HD mode may instruct the UE to deactivate the second antenna panel. The UE may determine whether to deactivate the second antenna panel based on various conditions. In one aspect, deactivation of the second antenna panel may depend on the length of the time window of the mode switching indication. For example, if the time window for switching to HD mode is greater than a threshold number of slots of time, e.g., 50 ms, the UE may determine to deactivate the second panel. In another aspect, deactivation of the second antenna panel may depend on a defined rule, e.g., in the specification. The UE may determine to keep the second panel activated to avoid unnecessary power consumption from switching on/off the antenna frequently.

FIG. 7 is a diagram 700 illustrating activation/deactivation of antenna panels of a method of wireless communication. The diagram 700 may include a UE 702 and a base station 704, and the UE 702 may include a plurality of antenna panels including a first antenna panel 701a and a second antenna panel 701b. The UE 702 and the base station 704 may support the HD mode and the FD mode, and may switch between the HD mode and the FD mode. For example, the duplex mode switch indication may include a panel activation/deactivation indication from the base station 704. In one aspect, the UE 702 and the base station 704 may operate in HD mode, and the UE 702 may use the first antenna panel 701a to communicate DL or UL transmissions in the HD mode. In another aspect, the base station 704 operating in HD mode may determine to switch the duplex mode from the HD mode to the FD mode, and instruct the UE 702 to activate the second antenna panel 701b to indicate the duplex mode switch from the HD mode to the FD mode. The UE 702 may activate the second antenna panel 701b to simultaneously communicate the DL and UL transmissions using the first antennal panel 701a and the second antenna panel 701b. In another aspect, the base station 704 operating in FD mode may determine to switch the duplex mode from the FD mode to the HD mode, and instruct the UE 702 to deactivate the second antenna panel 701b to indicate the duplex mode switch from the FD mode to the HD mode. The UE may deactivate the second antenna panel 701b and use the first antenna panel 701*a* to communicate DL or UL transmissions in the HD mode.

Figure 8A:
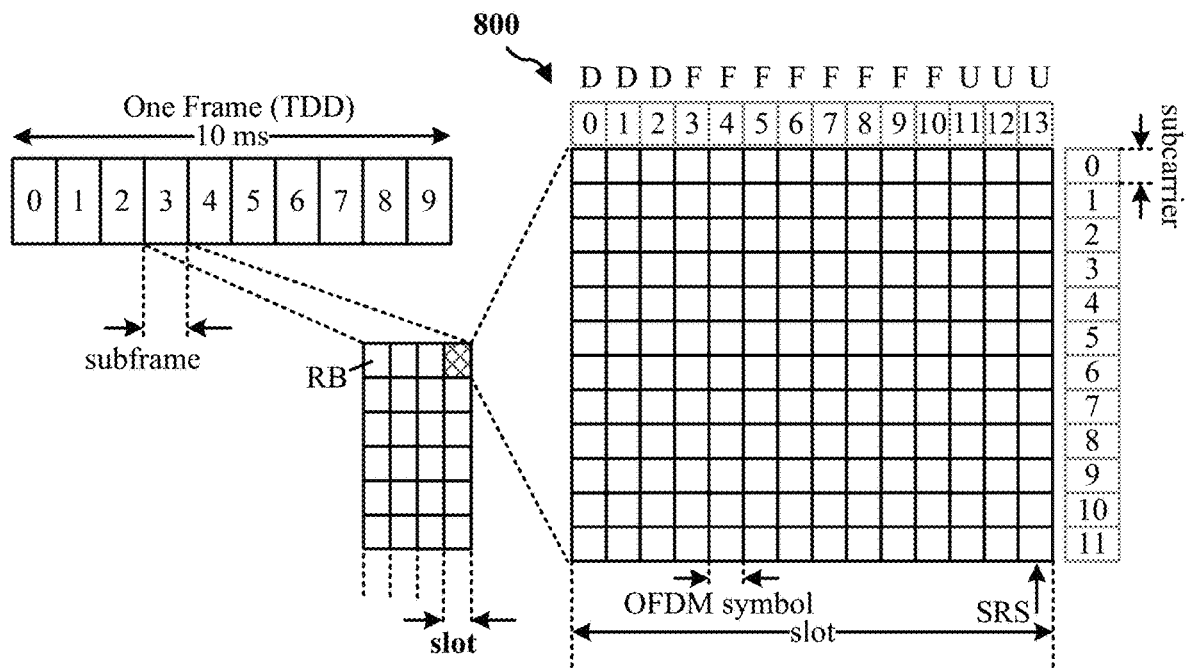
FIGS. 8A and 8B are diagrams illustrating an example of slot format change of a method of wireless communication.
Figure 8B:
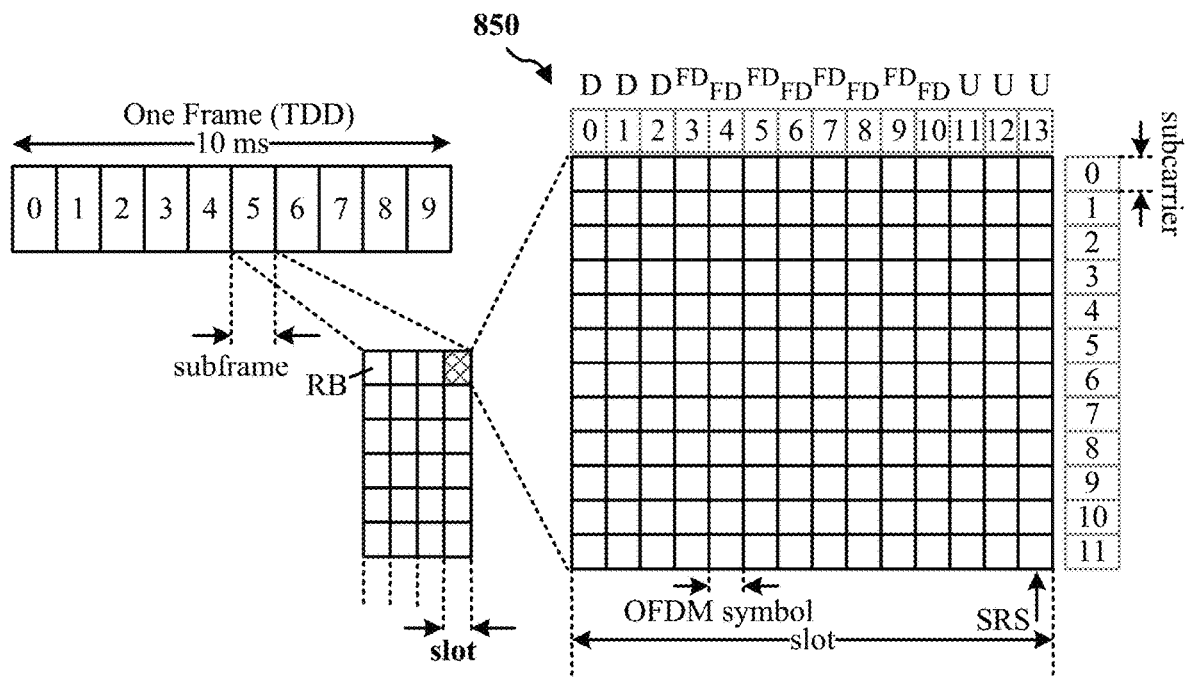

FIGS. 8A and 8B are diagrams 800 and 850 illustrating of an example of slot format change of a method of wireless communication. For example, the duplex mode may change from the HD mode to the FD mode between subframe 3 and subframe 5.

The diagram 800 may represent an example TDD slot format of the subframe 3 configured with the slot format 27, as provided in Table 1, where D is DL, U is UL, and F is the flexible symbol for DL/UL. That is, symbols 0, 1, and 2 are allocated for DL, symbols 3, 4, 5, 6, 7, 8, 9, and 10 are flexible symbols that may be used for DL or UL, and symbols 11, 12, and 13 are allocated for UL. The example slot format of the diagram 800 may correspond with a HD mode. The diagram 850 may represent an example TDD slot format of the subframe 5 configured with a modified slot format 27 based on the duplex mode switch, where D is DL, U is UL, and FD is the BD FD symbol for transmitting DL and UL simultaneously and support the FD communication. That is, symbols 0, 1, and 2 are allocated for DL, symbols 3, 4, 5, 6, 7, 8, 9, and 10 are FD symbols that may be used for DL or UL, and symbols 11, 12, and 13 are allocated for UL. The example slot format of the diagram 800 may correspond with the FD mode.

The diagram 800 of FIG. 8A may be an example of the existing slot format pattern that does not include any FD symbols. In case the UE is operating with the slot format 27 of diagram 800 and receives an instruction to switch from the HD mode to the FD mode without a corresponding slot format update, the UE and the base station may determine to operate in a FD mode to exchange FD communication using the flexible symbols (F symbols) of the existing slot format pattern. The diagram 850 of FIG. 8B may be an example of the slot format pattern that the UE and the base station may operate with when the UE and the base station may determine to operate in the FD mode to exchange FD communication the F symbols. That is, the UE and the base station may use the symbols 3, 4, 5, 6, 7, 8, 9, and 10 of the diagram 800 as the BD FD symbols to support the FD communication.

Figure 9A:
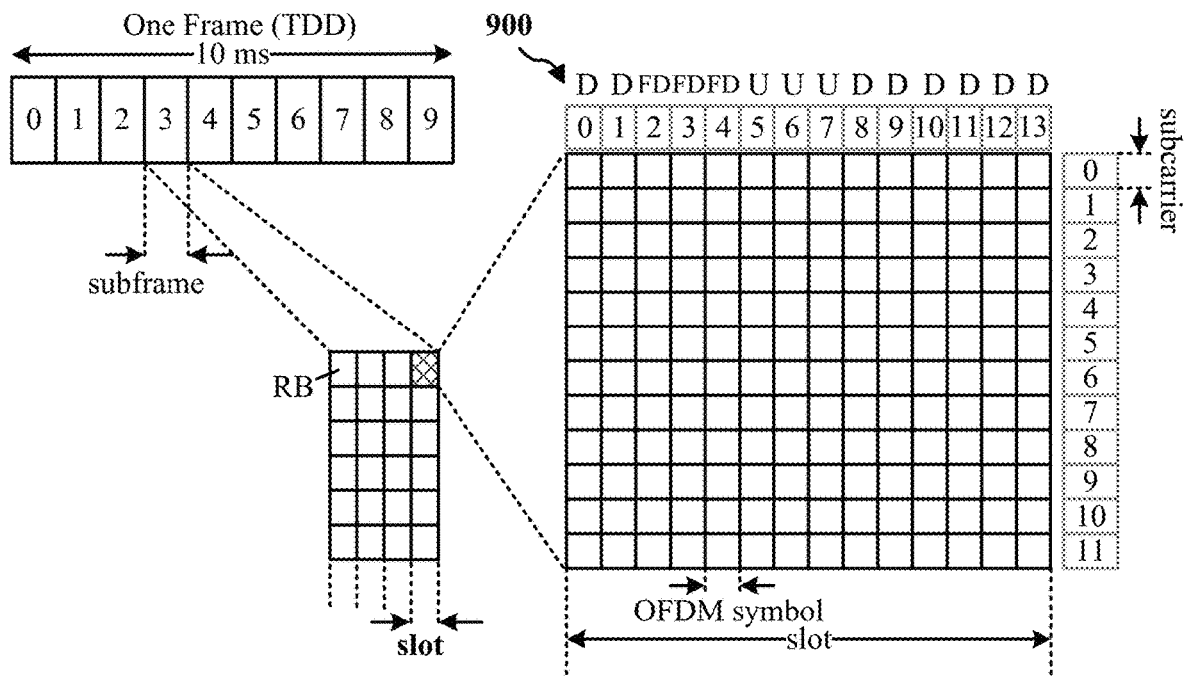
FIGS. 9A and 9B are diagrams illustrating example slot format change of a method of wireless communication.
Figure 9B:
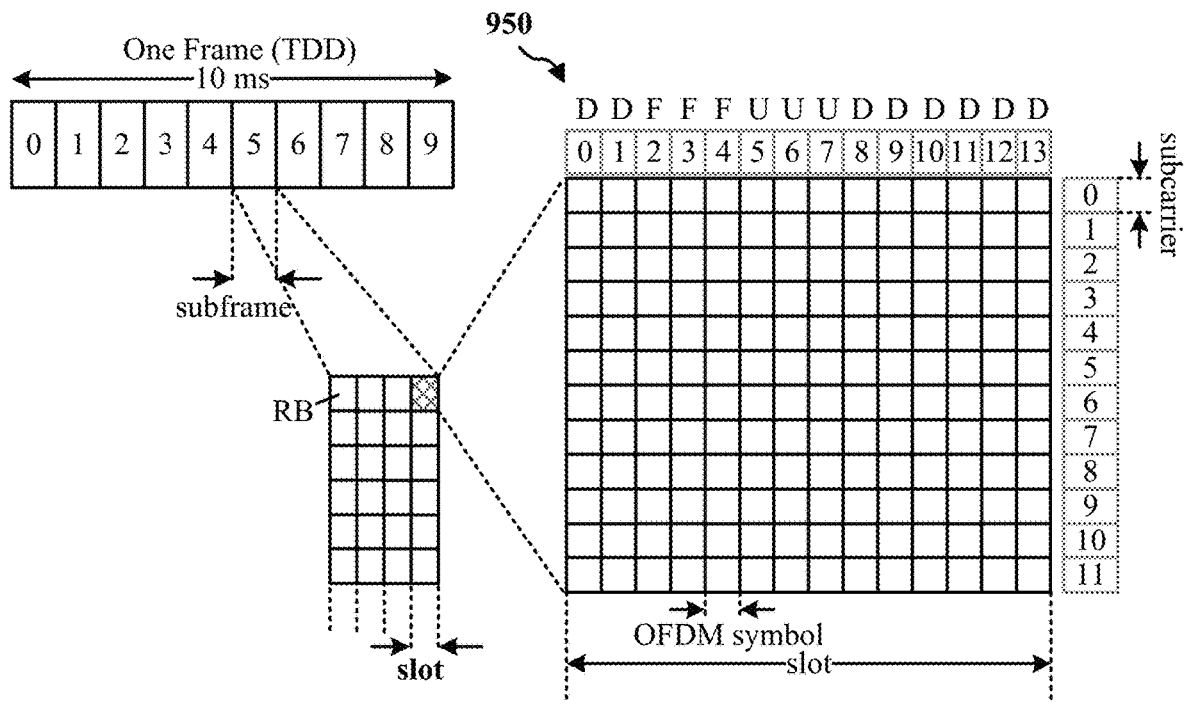

FIGS. 9A and 9B illustrate diagrams 900 and 950 illustrating of an example of slot format change of a method of wireless communication. For example, the duplex mode may change from the FD mode to the HD mode between subframe 3 and subframe 5.

The diagram 900 may represent an example TDD slot format of the subframe 3 configured with the slot format Z as provided in Table 1, where D is DL, U is UL, and FD is the BD FD symbol for transmitting DL and UL simultaneously and support the FD communication. That is, symbols 0, 1, 8, 9, 10, 11, 12, and 13 are allocated for DL, symbols 5, 6, and 7 are allocated for UL, and symbols 2, 3, and 4 are BD FD symbols for the FD communication. The example slot format of the diagram 950 may correspond with a FD mode. The diagram 950 may represent an example TDD slot format of the subframe 3 configured with a modified slot format Z based on the duplex mode switch, where D is DL, U is UL, and F is the flexible symbol for DL/UL. That is, symbols 0, 1, 8, 9, 10, 11, 12, and 13 are allocated for DL, symbols 5, 6, and 7 are allocated for UL, and symbols 2, 3, and 4 are flexible symbols that may be used for DL or UL. The example slot format of the diagram 950 may correspond with the FD mode.

The diagram 900 of FIG. 9A may be an example of the existing slot format pattern that includes FD symbols. In case the UE is operating with the slot format Z of diagram 900 and receives an instruction to switch from the FD mode to the HD mode without a corresponding slot format update, the UE and the base station may determine to treat the BD FD symbols as F symbols to operate in the HD mode using the BD FD symbols of the existing slot format pattern. The diagram 950 of FIG. 9B may be an example of the slot format pattern that the UE and the base station may operate with when the UE and the base station may determine to treat the BD FD symbols as F symbols to operate in the HD mode using the BD FD symbols of the existing slot format pattern. That is, the UE and the base station may determine to treat the symbols 2, 3, and 4 of the diagram 950 as the F symbols to operate in the HD mode.

Figure 10:
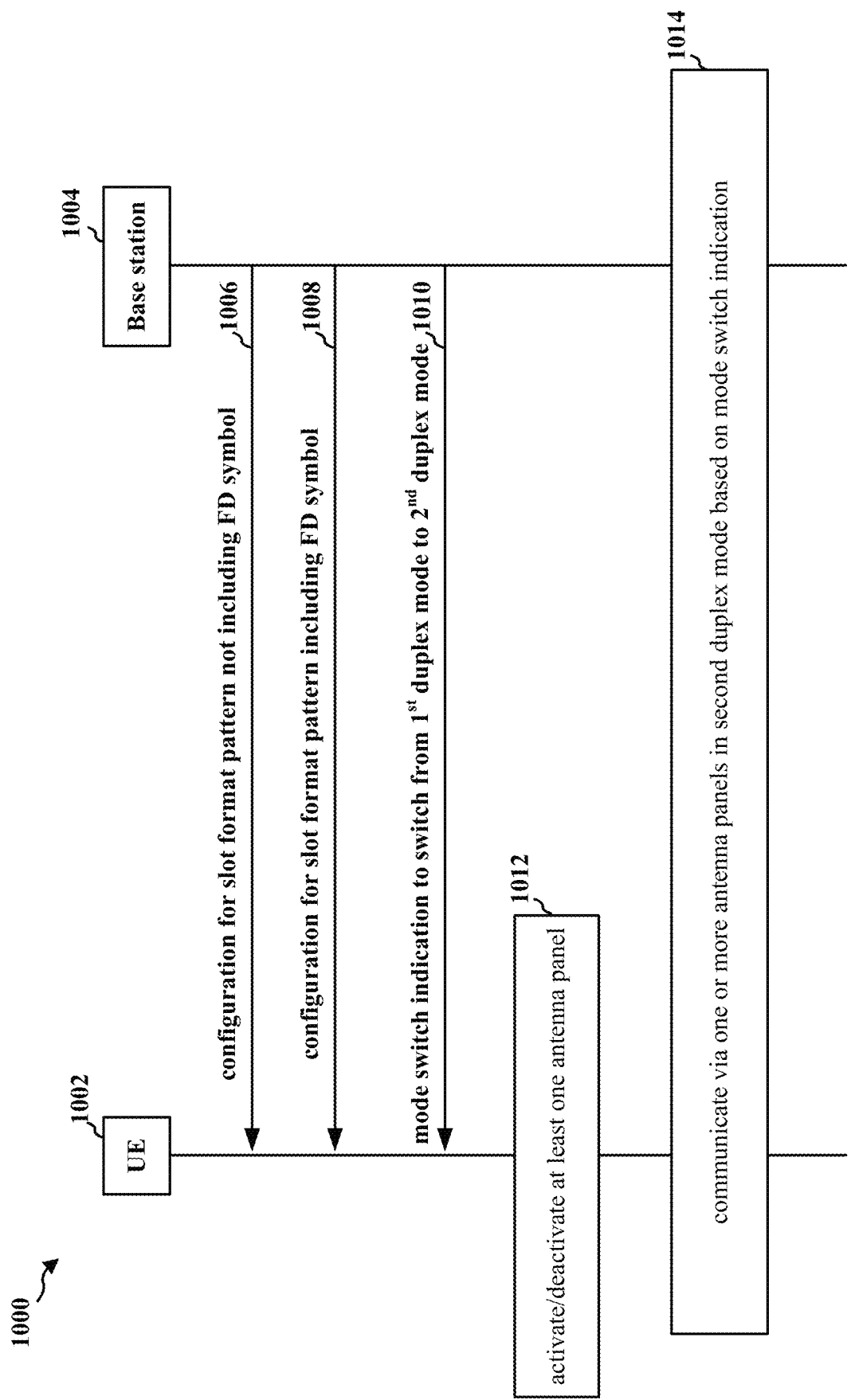
FIG. 10 is a communication diagram of a method of wireless communication.

FIG. 10 is a communication diagram 1000 of a method of wireless communication.

The communication diagram 1000 may include a UE 1002 and a base station 1004. The base station 1004 may transmit a mode switch indication to the UE 1002 to switch from a first duplex mode to a second duplex mode. The mode switch indication may also be referred to as, or considered, an antenna panel activation/deactivation indication. The UE 1002 may activate or deactivate one or more antenna panels and communicate with the base station 1004 based on the received mode switch indication.

At 1006, the base station 1004 may transmit, to the UE 1002, a configuration for a slot format pattern that does not include an FD symbol for FD mode, and the UE 1002 may receive, from the base station 1004, the configuration for a slot format pattern that does not include the FD symbol for FD mode.

1008, the base station 1004 may transmit, to the UE 1002, a configuration for the slot format pattern including FD symbols for FD mode, and the UE 1002 may receive, from the base station 1004, the configuration for the slot format pattern including FD symbols for FD mode.

At 1010, the base station 1004 may transmit, to the UE 1002, a mode switch indication to switch from a first duplex mode to a second duplex mode, and the UE 1002 may receive, from the base station 1004, the mode switch indication to switch from the first duplex mode to the second duplex mode. For example, the mode switch indication may be transmitted in one or more of an RRC message, a MAC-CE, or DCI. In one aspect, the mode switch indication may include a time duration indicating a time window for the UE 1002 to operate in the second duplex mode.

In one aspect, the UE 1002 received the configuration 1006 without FD symbols, the indication 1010 may indicate to the UE to switch to a FD mode, and the UE 1002 may respond by treating flexible symbols of the slot format pattern as FD symbols. For example, referring to FIGS. 8A and 8B, the UE 1002 and the base station 1004 may be operating in HD mode with the slot format 27 of diagram 800, and in response to receiving the indication to switch from the HD mode to the FD mode, the UE 1002 and the base station 1004 may use the flexible symbols 3, 4, 5, 6, 7, 8, 10, and 10 as FD symbols that may be used for simultaneous transmission of DL and UL of diagram 850.

In another aspect, the UE 1002 received the configuration 1008 with FD symbols, the indication 1010 may indicate to the UE 1002 to switch to a HD mode, and the UE 1002 may respond by treating the FD symbols of the slot format pattern as flexible symbols. For example, referring to FIGS. 9A and 9B, the UE 1002 and the base station 1004 may be operating in FD mode with the slot format Z of diagram 900, and in response to receiving the indication to switch from the FD mode to the HD mode, the UE 1002 and the base station 1004 may use the FD symbols 2, 3, and 4 as flexible symbols that may be used for at least one of DL or UL of diagram 950.

In some aspects, the receipt of the configuration 1008 after the configuration 1006 may be considered an indication from the base station 1004 to switch to a FD mode, e.g., to activate an antenna panel. In some aspects, the configuration 1008 may be received prior to the configuration 1006, and the configuration 1006 may be considered to be an indication to switch to a HD mode, e.g., to deactivate one or more antenna panels.

In one aspect, the mode switch indication may include a panel activation or deactivation indication. The mode switch indication to switch from HD mode to FD mode may be received at a threshold number of symbols or slots prior to the one or more flexible symbols. Here, the threshold number of symbols or slots may correspond to a time that the UE 1002 may need to prepare certain configurations. For example, the threshold number of symbols or slots may correspond to a time that the UE 1002 may need to activate at least one antenna panel to transmit bidirectional beams in the FD mode. For example, referring to FIG. 7, the UE 1002 may include the first antenna panel 701a and the second antenna panel 701b, and the UE 1002 may activate or deactivate the first antenna panel 701a and the second antenna panel 701b based on the panel activation or deactivate indication received from the base station 1004.

In another aspect, the mode switch indication may include a slot format pattern that includes one or more FD symbols for the FD mode. That is, the base station 1004 may transmit the slot format pattern including the FD symbol for the FD mode to the UE 1002, and the slot format pattern including one or more FD symbols for the FD mode may indicate the UE 1002 of a duplex mode switch from the HD to the FD mode.

At 1012, the UE 1002 may activate or deactivate at least one antenna panel. That is, the UE 1002 may activate at least one antenna panel based on the mode switch indication instructing the UE 1002 to switch the duplex mode from the HD mode to the FD mode, and the UE 1002 may deactivate at least one antenna panel based on the mode switch indication instructing the UE 1002 to switch the duplex mode from the FD mode to the HD mode.

In one aspect, the first duplex mode may be the HD mode and the second duplex mode may be the FD mode. The UE 1002 may have a first antenna panel activated in the HD mode, and may activate a second antenna panel to transmit signals in FD mode. The UE 1002 may initiate the activation of the second antenna panel the threshold number of symbols or slots prior to the one or more flexible symbols, where the threshold number of symbols or slots may correspond to a time that the UE 1002 uses to activate the second antenna panel. In another aspect, the first duplex mode may be the FD mode and the second duplex mode may be the HD mode. The UE 1002 may have a first antenna panel activated to transmit and the second antenna panel activated to receive in the FD mode, and may deactivate one of the antenna panels in response to switching the operation from the FD mode to the HD mode.

In some aspects, the mode switch indication received at 1010 may include the time duration indicating the time window for the UE 1002 to operate in the second duplex mode. The UE 1002 may activate or deactivate at least one antenna panel based on the time duration included in the mode switch indication. In one aspect, the first duplex mode may be the HD mode and the second duplex mode may be the FD mode, and the UE 1002 may activate the second antenna panel to operate in the FD mode for the time duration of the mode switch indication. In another aspect, the first duplex mode may be FD mode and the second duplex mode may be HD mode, and the UE 1002 may deactivate the second antenna panel for the time duration of the mode switch indication. Here, the deactivation of the second antenna panel may depend on the length of the time duration indicating the time window of the mode switching indication. That is, the UE 1002 may deactivate the second antenna panel based on a length of the time window being greater than or equal to a threshold value.

At 1014, the base station 1004 and the UE 1002 may communicate with each other via one or more antenna panels in the second duplex mode based on the mode switch indication received at 1010. In one aspect, the first duplex mode may be the HD mode, and the second duplex mode may be the FD mode, and the base station 1004 and the UE 1002 may communicate with each other via one or more antenna panels in the FD mode based on the mode switch indication received at 1010. When the slot format pattern not including the FD symbol is received at 1006, the base station 1004 and the UE 1002 may communicate with each other in FD mode using one or more flexible symbols of the slot format pattern. When the slot format pattern including the FD symbols is received at 1008 or 1010, the base station 1004 and the UE 1002 may communicate with each other in the FD mode during one or more FD symbols of the slot format pattern.

In another aspect, the first duplex mode may be the FD mode, and the second duplex mode may be the HD mode, and the base station 1004 and the UE 1002 may communicate with each other via one or more antenna panels in the HD mode based on the mode switch indication received at 1010. When the slot format pattern that does not include the FD symbol is received at 1006, the base station 1004 and the UE 1002 may communicate with each other in the HD mode using one or more flexible symbols of the slot format pattern. When the slot format pattern including the FD symbols is received at 1008 or 1010, the base station 1004 and the UE 1002 may communicate with each other in the HD mode using one or more FD symbols as flexible symbols.

Figure 11:
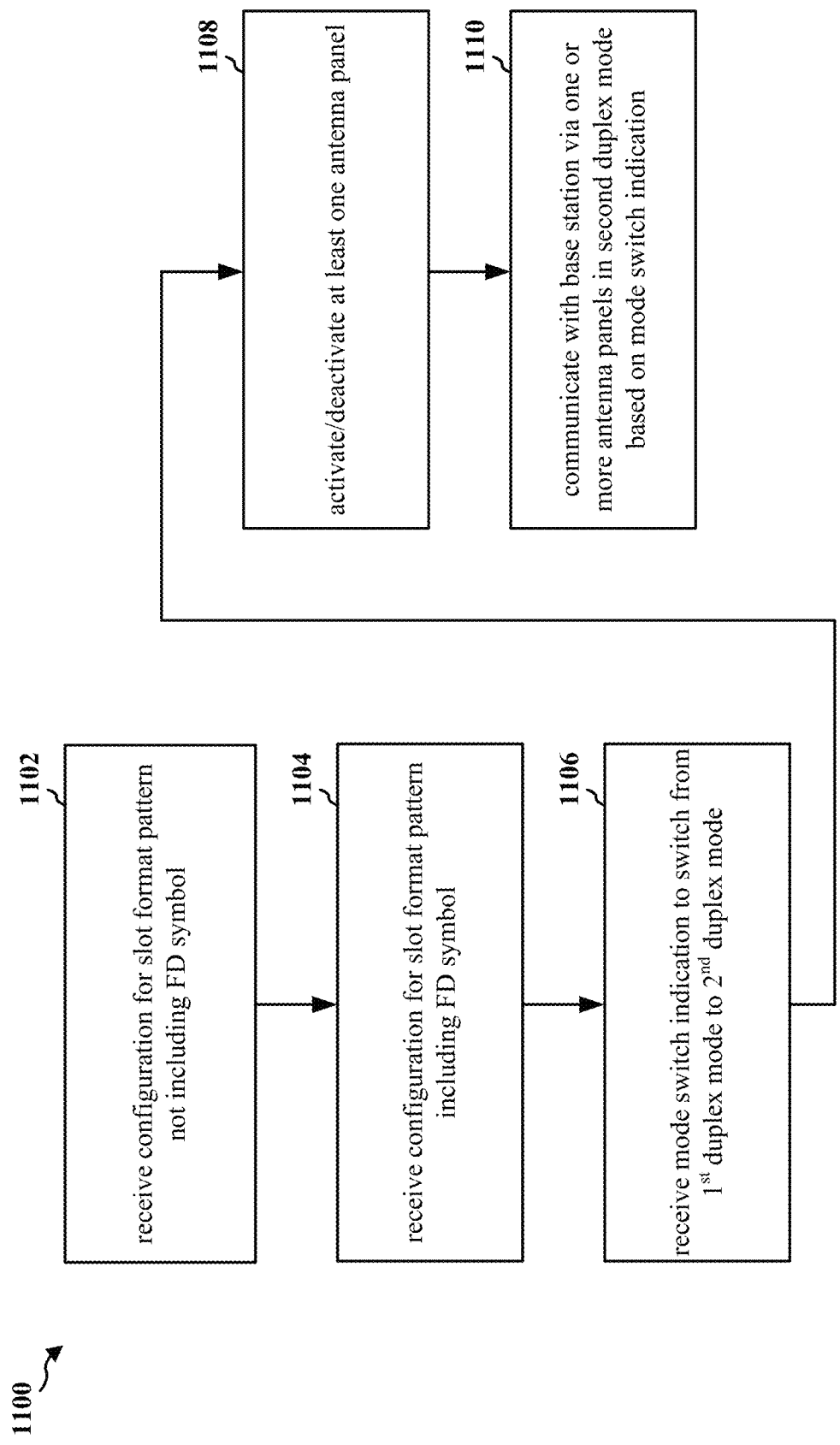
FIG. 11 is a flowchart of a method of wireless communication.

FIG. 11 is a flowchart 1100 of a method of wireless communication. The method may be performed by a UE (e.g., the UE 104/702/1002; the apparatus 1502). The UE may receive a mode switch indication from a base station to switch from a first duplex mode to a second duplex mode. The mode switch indication may also be referred to as, or considered, an antenna panel activation/deactivation indication. The UE may activate or deactivate one or more antenna panels and communicate with the base station 1004 based on the received mode switch indication.

At 1102, the UE may receive a configuration for a slot format pattern that does not include the FD symbol for FD mode. For example, at 1006, the UE 1002 may receive, from the base station 1004, the configuration for a slot format pattern that does not include the FD symbol for FD mode. Furthermore, 1102 may be performed by a slot format pattern managing component 1540.

At 1104, the UE may receive a configuration for the slot format pattern including FD symbols for FD mode. For example, at 1008, the UE 1002 may receive, from the base station 1004, the configuration for the slot format pattern including FD symbols for FD mode. Furthermore, 1104 may be performed by the slot format pattern managing component 1540.

At 1106, the UE may receive the mode switch indication to switch from the first duplex mode to the second duplex mode. For example, the mode switch indication may be transmitted in one or more of an RRC message, a MAC-CE, or DCI. In one aspect, the mode switch indication may include a time duration indicating a time window for the UE to operate in the second duplex mode. If the UE received the configuration without FD symbols, the indication may indicate to the UE to switch to a FD mode, and the UE may respond by treating flexible symbols of the slot format pattern as FD symbols. Alternately, if the UE received the configuration with FD symbols, the indication may indicate to the UE to switch to a HD mode, and the UE may respond by treating the FD symbols of the slot format pattern as flexible symbols.

In some aspects, the receipt of the configuration after the configuration may be considered an indication from the base station to switch to a FD mode, e.g., to activate an antenna panel. In some aspects, the configuration may be received prior to the configuration, and the configuration may be considered to be an indication to switch to a HD mode, e.g., to deactivate one or more antenna panels.

In one aspect, the mode switch indication may include a panel activation or deactivation indication. The mode switch indication to switch from HD mode to FD mode may be received at a threshold number of symbols or slots prior to the one or more flexible symbols. Here, the threshold number of symbols or slots may correspond to a time that the UE may need to prepare certain configurations. For example, the threshold number of symbols or slots may correspond to a time that the UE may need to activate at least one antenna panel to transmit bidirectional beams in FD mode.

In another aspect, the mode switch indication may include a slot format pattern that includes one or more FD symbols for the FD mode. That is, the base station may transmit the slot format pattern including the FD symbol for the FD mode to the UE, and the slot format pattern including one or more FD symbols for the FD mode may indicate the UE of a duplex mode switch from the HD to the FD mode. For example, at 1010, the UE 1002 may receive, from the base station 1004, the mode switch indication to switch from the first duplex mode to the second duplex mode. Furthermore, 1106 may be performed by a duplex mode managing component 1544.

At 1108, the UE may activate or deactivate at least one antenna panel. That is, the UE may activate at least one antenna panel based on the mode switch indication instructing the UE to switch the duplex mode from HD mode to FD mode, and the UE may deactivate at least one antenna panel based on the mode switch indication instructing the UE to switch the duplex mode from the FD mode to the HD mode.

In one aspect, the first duplex mode may be the HD mode and the second duplex mode may be the FD mode. The UE may have a first antenna panel activated in the HD mode, and may activate a second antenna panel to transmit bidirectional signals in FD mode. The UE may initiate the activation of the second antenna panel the threshold number of symbols or slots prior to the one or more flexible symbols, where the threshold number of symbols or slots may correspond to a time that the UE uses to activate the second antenna panel. In another aspect, the first duplex mode may be the FD mode and the second duplex mode may be the HD mode. The UE may have a first antenna panel activated to transmit and the second antenna panel activated to receive in the FD mode, and may deactivate one of the antenna panels in response to switching the operation from the FD mode to the HD mode.

In some aspects, the mode switch indication received at 1106 may include the time duration indicating the time window for the UE to operate in the second duplex mode. The UE may activate or deactivate at least one antenna panel based on the time duration included in the mode switch indication. In one aspect, the first duplex mode may be the HD mode and the second duplex mode may be the FD mode, and the UE may activate the second antenna panel to operate in the FD mode for the time duration of the mode switch indication. In another aspect, the first duplex mode may be FD mode and the second duplex mode may be HD mode, and the UE may deactivate the second antenna panel for the time duration of the mode switch indication. Here, the deactivation of the second antenna panel may depend on the length of the time duration indicating the time window of the mode switching indication. That is, the UE may deactivate the second antenna panel based on a length of the time window being greater than or equal to a threshold value. For example, at 1012, the UE 1002 may activate or deactivate at least one antenna panel. Furthermore, 1108 may be performed by an antenna managing component 1542.

At 1110, the UE may communicate with the base station via one or more antenna panels in the second duplex mode based on the mode switch indication received at 1106. In one aspect, the first duplex mode may be the HD mode, and the second duplex mode may be the FD mode, and the base station and the UE may communicate with each other via one or more antenna panels in the FD mode based on the mode switch indication received at 1106. When the slot format pattern not including the FD symbol is received at 1102, the base station and the UE may communicate with each other in FD mode using one or more flexible symbols of the slot format pattern. When the slot format pattern including the FD symbols is received at 1104 or 1106, the base station and the UE may communicate with each other in the FD mode during one or more FD symbols of the slot format pattern.

In another aspect, the first duplex mode may be the FD mode, and the second duplex mode may be the HD mode, and the base station and the UE may communicate with each other via one or more antenna panels in the HD mode based on the mode switch indication received at 1106. When the slot format pattern that does not include the FD symbol is received at 1102, the base station and the UE may communicate with each other in the HD mode using one or more flexible symbols of the slot format pattern. When the slot format pattern including the FD symbols is received at 1104 or 1106, the base station and the UE may communicate with each other in the HD mode using one or more FD symbols as flexible symbols. For example, at 1014, the UE 1002 may communicate with the base station 1004 via one or more antenna panels in the second duplex mode based on the mode switch indication received at 1010. Furthermore, 1110 may be performed by the duplex mode managing component 1544.

Figure 12:
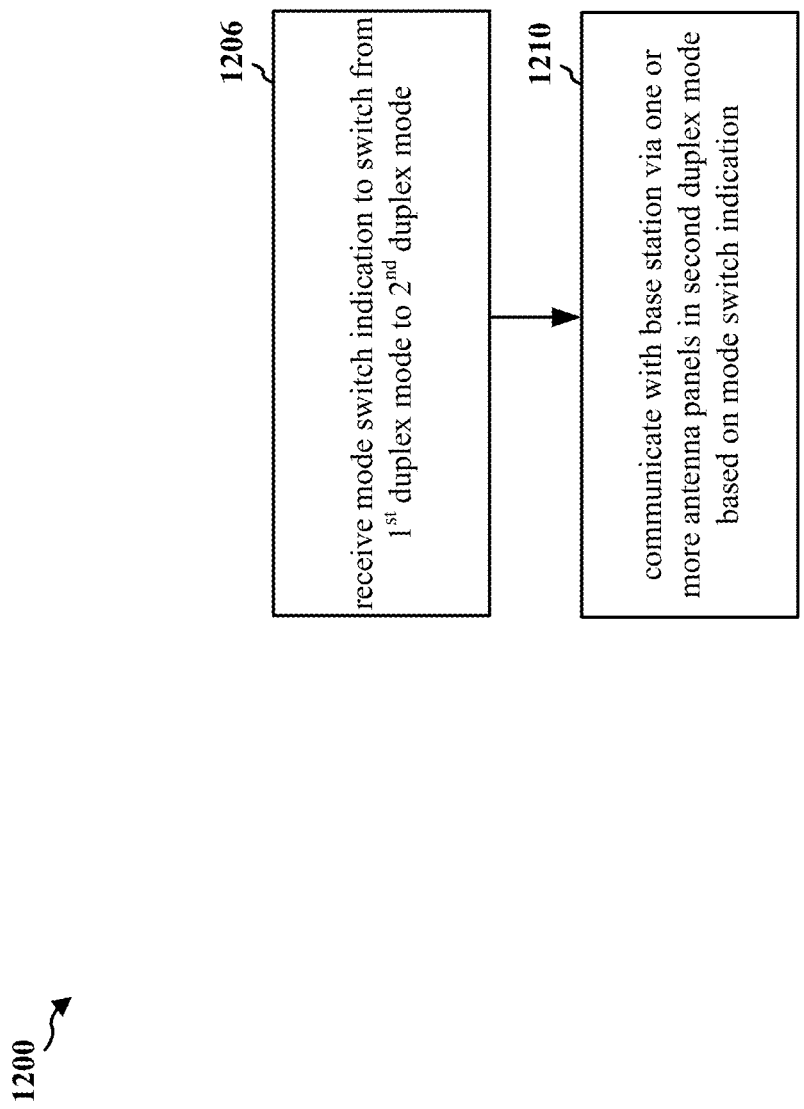
FIG. 12 is a flowchart of a method of wireless communication.

FIG. 12 is a flowchart 1200 of a method of wireless communication. The method may be performed by a UE (e.g., the UE 104/702/1002; the apparatus 1502). The UE may receive a mode switch indication from a base station to switch from a first duplex mode to a second duplex mode. The mode switch indication may also be referred to as, or considered, an antenna panel activation/deactivation indication. The UE may activate or deactivate one or more antenna panels and communicate with the base station 1004 based on the received mode switch indication.

At 1206, the UE may receive the mode switch indication to switch from the first duplex mode to the second duplex mode. For example, the mode switch indication may be transmitted in one or more of an RRC message, a MAC-CE, or DCI. In one aspect, the mode switch indication may include a time duration indicating a time window for the UE to operate in the second duplex mode. If the UE received the configuration without FD symbols, the indication may indicate to the UE to switch to a FD mode, and the UE may respond by treating flexible symbols of the slot format pattern as FD symbols. Alternately, if the UE received the configuration with FD symbols, the indication may indicate to the UE to switch to a HD mode, and the UE may respond by treating the FD symbols of the slot format pattern as flexible symbols.

In some aspects, the receipt of the configuration after the configuration may be considered an indication from the base station to switch to a FD mode, e.g., to activate an antenna panel. In some aspects, the configuration may be received prior to the configuration, and the configuration may be considered to be an indication to switch to a HD mode, e.g., to deactivate one or more antenna panels.

In one aspect, the mode switch indication may include a panel activation or deactivation indication. The mode switch indication to switch from HD mode to FD mode may be received at a threshold number of symbols or slots prior to the one or more flexible symbols. Here, the threshold number of symbols or slots may correspond to a time that the UE may need to prepare certain configurations. For example, the threshold number of symbols or slots may correspond to a time that the UE may need to activate at least one antenna panel to transmit bidirectional beams in FD mode.

In another aspect, the mode switch indication may include a slot format pattern that includes one or more FD symbols for the FD mode. That is, the base station may transmit the slot format pattern including the FD symbol for the FD mode to the UE, and the slot format pattern including one or more FD symbols for the FD mode may indicate the UE of a duplex mode switch from the HD to the FD mode. For example, at 1010, the UE 1002 may receive, from the base station 1004, the mode switch indication to switch from the first duplex mode to the second duplex mode. Furthermore, 1206 may be performed by a duplex mode managing component 1544.

At 1210, the UE may communicate with the base station via one or more antenna panels in the second duplex mode based on the mode switch indication received at 1206. In one aspect, the first duplex mode may be the HD mode, and the second duplex mode may be the FD mode, and the base station and the UE may communicate with each other via one or more antenna panels in the FD mode based on the mode switch indication received at 1206. When the slot format pattern not including the FD symbol is received at 1202, the base station and the UE may communicate with each other in FD mode using one or more flexible symbols of the slot format pattern. When the slot format pattern including the FD symbols is received at 1204 or 1206, the base station and the UE may communicate with each other in the FD mode during one or more FD symbols of the slot format pattern.

In another aspect, the first duplex mode may be the FD mode, and the second duplex mode may be the HD mode, and the base station and the UE may communicate with each other via one or more antenna panels in the HD mode based on the mode switch indication received at 1206. When the slot format pattern that does not include the FD symbol is received at 1202, the base station and the UE may communicate with each other in the HD mode using one or more flexible symbols of the slot format pattern. When the slot format pattern including the FD symbols is received at 1204 or 1206, the base station and the UE may communicate with each other in the HD mode using one or more FD symbols as flexible symbols. For example, at 1014, the UE 1002 may communicate with the base station 1004 via one or more antenna panels in the second duplex mode based on the mode switch indication received at 1010. Furthermore, 1210 may be performed by the duplex mode managing component 1544.

Figure 13:
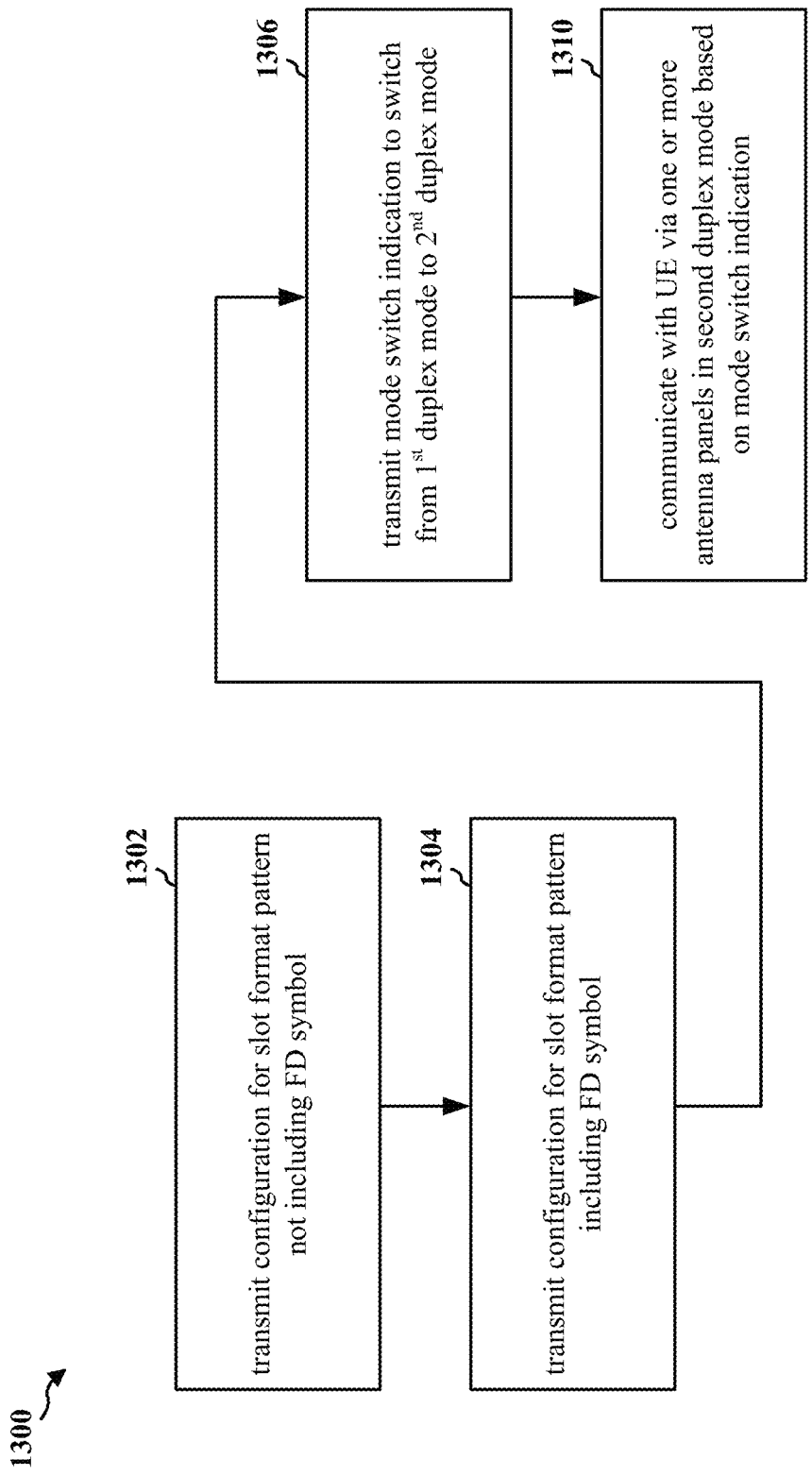
FIG. 13 is a flowchart of a method of wireless communication.

FIG. 13 is a flowchart 1300 of a method of wireless communication. The method may be performed by a base station (e.g., the base station 102/180/704/1004; the apparatus 1602). The base station may transmit a mode switch indication to a UE to switch from a first duplex mode to a second duplex mode. The mode switch indication may also be referred to as, or considered, an antenna panel activation/deactivation indication. The base station may communicate with the UE based on the received mode switch indication.

At 1302, the base station may transmit a configuration for a slot format pattern that does not include an FD symbol for FD mode. For example, at 1006, the base station 1004 may transmit, to the UE 1002, a configuration for a slot format pattern that does not include an FD symbol for FD mode. Furthermore, 1302 may be performed by a slot format pattern managing component 1640.

At 1304, the base station may transmit a configuration for the slot format pattern including FD symbols for FD mode. For example, at 1008, the base station 1004 may transmit, to the UE 1002, a configuration for the slot format pattern including FD symbols for FD mode. Furthermore, 1304 may be performed by the slot format pattern managing component 1640.

At 1306, the base station may transmit a mode switch indication to switch from a first duplex mode to a second duplex mode. For example, the mode switch indication may be transmitted in one or more of an RRC message, a MAC-CE, or DCI. In one aspect, the mode switch indication may include a time duration indicating a time window for the UE to operate in the second duplex mode. If the base station transmitted the configuration without FD symbols, the indication may indicate to the UE to switch to a FD mode, and the base station and the UE may treat flexible symbols of the slot format pattern as FD symbols. Alternately, if the base station transmitted the configuration with FD symbols, the indication may indicate to the UE to switch to a HD mode, and the base station and the UE may treat the FD symbols of the slot format pattern as flexible symbols.

In some aspects, the transmission of the configuration after the configuration may be considered an indication for the UE to switch to a FD mode, e.g., to activate an antenna panel. In some aspects, the configuration may be transmitted prior to the configuration, and the configuration may be considered to be an indication for the UE to switch to a HD mode, e.g., to deactivate one or more antenna panels.

In one aspect, the mode switch indication may include a panel activation or deactivation indication. The mode switch indication to switch from HD mode to FD mode may be received at a threshold number of symbols or slots prior to the one or more flexible symbols. Here, the threshold number of symbols or slots may correspond to a time that the UE may need to prepare certain configurations. For example, the threshold number of symbols or slots may correspond to a time that the UE may need to activate at least one antenna panel to transmit bidirectional beams in FD mode.

In another aspect, the mode switch indication may include a slot format pattern that includes one or more FD symbols for the FD mode. That is, the base station may transmit the slot format pattern including the FD symbol for the FD mode to the UE, and the slot format pattern including one or more FD symbols for the FD mode may indicate the UE of a duplex mode switch from HD to the FD mode. For example, at 1010, the base station 1004 may transmit, to the UE 1002, a mode switch indication to switch from a first duplex mode to a second duplex mode. Furthermore, 1306 may be performed by a duplex mode managing component 1642.

At 1310, the base station may communicate with the UE via one or more antenna panels in the second duplex mode based on the mode switch indication received at 1306. In one aspect, the first duplex mode may be the HD mod, and the second duplex mode may be the FD mode, and the base station and the UE may communicate with each other via one or more antenna panels in the FD mode based on the mode switch indication received at 1306. When the slot format pattern not including the FD symbol is received at 1302, the base station and the UE may communicate with each other in FD mode using one or more flexible symbols of the slot format pattern. When the slot format pattern including the FD symbols is received at 1304 or 1306, the base station and the UE may communicate with each other in the FD mode during one or more FD symbols of the slot format pattern.

In another aspect, the first duplex mode may be the FD mode, and the second duplex mode may be the HD mode, and the base station and the UE may communicate with each other via one or more antenna panels in the HD mode based on the mode switch indication received at 1306. When the slot format pattern that does not include the FD symbol is received at 1302, the base station and the UE may communicate with each other in the HD mode using one or more flexible symbols of the slot format pattern. When the slot format pattern including the FD symbols is received at 1304 or 1306, the base station and the UE may communicate with each other in the HD mode using one or more FD symbols as flexible symbols. For example, at 1014, the base station 1004 may communicate with the UE 1002 via one or more antenna panels in the second duplex mode based on the mode switch indication received at 1010. Furthermore, 1310 may be performed by the duplex mode managing component 1642.

Figure 14:
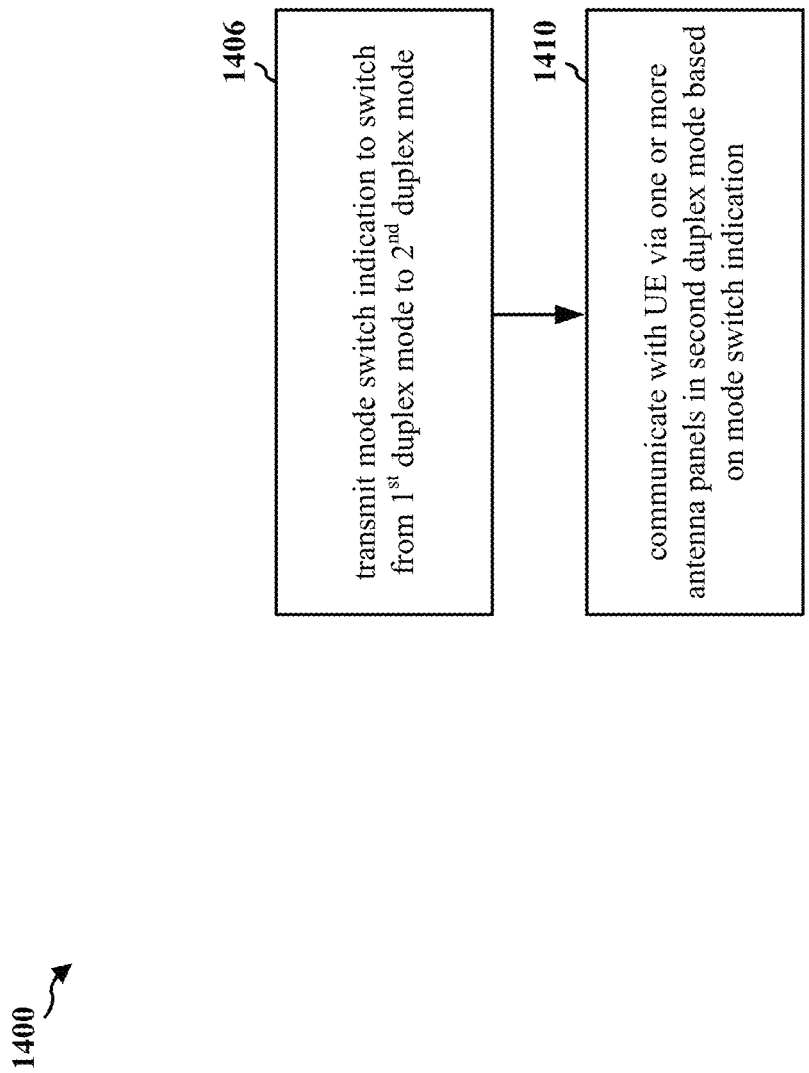
FIG. 14 is a flowchart of a method of wireless communication.

FIG. 14 is a flowchart 1400 of a method of wireless communication. The method may be performed by a base station (e.g., the base station 102/180/704/1004; the apparatus 1602). The base station may transmit a mode switch indication to a UE to switch from a first duplex mode to a second duplex mode. The mode switch indication may also be referred to as, or considered, an antenna panel activation/deactivation indication. The base station may communicate with the UE based on the received mode switch indication.

At 1406, the base station may transmit a mode switch indication to switch from a first duplex mode to a second duplex mode. For example, the mode switch indication may be transmitted in one or more of an RRC message, a MAC-CE, or DCI. In one aspect, the mode switch indication may include a time duration indicating a time window for the UE to operate in the second duplex mode. If the base station transmitted the configuration without FD symbols, the indication may indicate to the UE to switch to a FD mode, and the base station and the UE may treat flexible symbols of the slot format pattern as FD symbols. Alternately, if the base station transmitted the configuration with FD symbols, the indication may indicate to the UE to switch to a HD mode, and the base station and the UE may treat the FD symbols of the slot format pattern as flexible symbols.

In some aspects, the transmission of the configuration after the configuration may be considered an indication for the UE to switch to a FD mode, e.g., to activate an antenna panel. In some aspects, the configuration may be transmitted prior to the configuration, and the configuration may be considered to be an indication for the UE to switch to a HD mode, e.g., to deactivate one or more antenna panels.

In one aspect, the mode switch indication may include a panel activation or deactivation indication. The mode switch indication to switch from HD mode to FD mode may be received at a threshold number of symbols or slots prior to the one or more flexible symbols. Here, the threshold number of symbols or slots may correspond to a time that the UE may need to prepare certain configurations. For example, the threshold number of symbols or slots may correspond to a time that the UE may need to activate at least one antenna panel to transmit bidirectional beams in FD mode.

In another aspect, the mode switch indication may include a slot format pattern that includes one or more FD symbols for the FD mode. That is, the base station may transmit the slot format pattern including the FD symbol for the FD mode to the UE, and the slot format pattern including one or more FD symbols for the FD mode may indicate the UE of a duplex mode switch from the HD to the FD mode. For example, at 1010, the base station 1004 may transmit, to the UE 1002, a mode switch indication to switch from a first duplex mode to a second duplex mode. Furthermore, 1406 may be performed by a duplex mode managing component 1642.

At 1410, the base station may communicate with the UE via one or more antenna panels in the second duplex mode based on the mode switch indication received at 1406. In one aspect, the first duplex mode may be the HD mod, and the second duplex mode may be the FD mode, and the base station and the UE may communicate with each other via one or more antenna panels in the FD mode based on the mode switch indication received at 1406. When the slot format pattern not including the FD symbol is received at 1402, the base station and the UE may communicate with each other in FD mode using one or more flexible symbols of the slot format pattern. When the slot format pattern including the FD symbols is received at 1404 or 1406, the base station and the UE may communicate with each other in the FD mode during one or more FD symbols of the slot format pattern.

In another aspect, the first duplex mode may be the FD mode, and the second duplex mode may be the HD mode, and the base station and the UE may communicate with each other via one or more antenna panels in the HD mode based on the mode switch indication received at 1406. When the slot format pattern that does not include the FD symbol is received at 1402, the base station and the UE may communicate with each other in the HD mode using one or more flexible symbols of the slot format pattern. When the slot format pattern including the FD symbols is received at 1404 or 1406, the base station and the UE may communicate with each other in the HD mode using one or more FD symbols as flexible symbols. For example, at 1014, the base station 1004 may communicate with the UE 1002 via one or more antenna panels in the second duplex mode based on the mode switch indication received at 1010. Furthermore, 1410 may be performed by the duplex mode managing component 1642.

Figure 15:
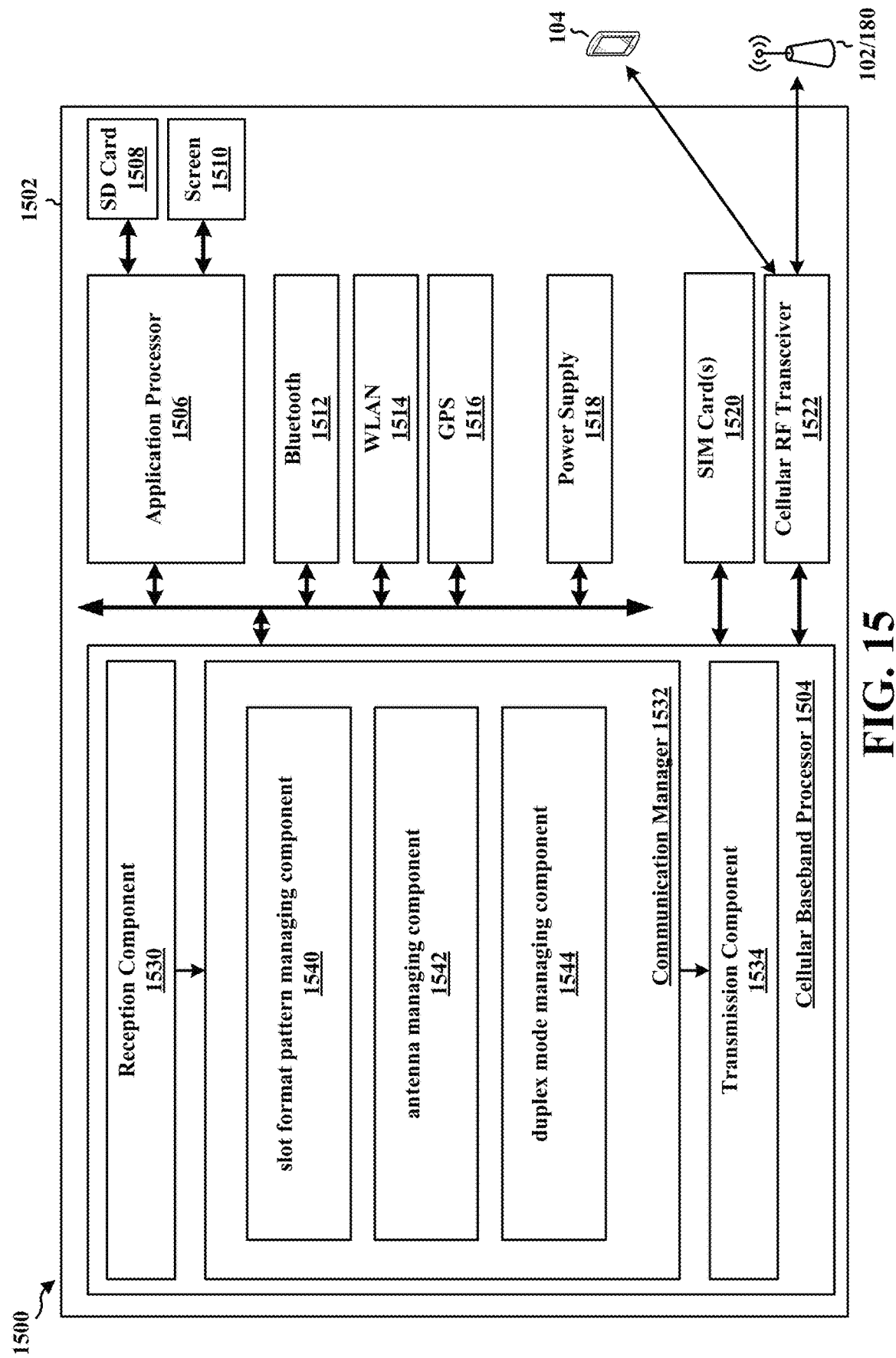
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1102 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or base station 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a slot format pattern managing component 1540 that is configured to receive a configuration for a slot format pattern that does not include the FD symbol for FD mode or a configuration for the slot format pattern including FD symbols for FD mode, e.g., as described in connection with 1002 and 1004. The communication manager 1532 further includes an antenna managing component 1542 that is configured to activate or deactivate at least one antenna panel, e.g., as described in connection with 1008. The communication manager 1532 further includes a duplex mode managing component 1544 that is configured to receive the mode switch indication to switch from the first duplex mode to the second duplex mode, and communicate with the base station via one or more antenna panels in the second duplex mode based on the mode switch indication, e.g., as described in connection with 1006, 1010, 1106, and 1110.

The apparatus may include additional components that perform each of the blocks of the algorithm in the flowcharts of FIGS. 10, 11, and 12. As such, each block in the flowcharts of FIGS. 10, 11, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for receiving, from a base station, a mode switch indication to switch from a first duplex mode to a second duplex mode, and means for communicating with the base station via one or more antenna panels in the second duplex mode based on the mode switch indication. The apparatus 1502 includes means for receiving, from a base station, a configuration for a slot format pattern that does not include at least one FD symbol for FD mode, and means for receive a configuration for a slot format pattern including FD symbols for FD mode, the mode switch indication indicating to the UE to switch from FD mode to HD mode. The apparatus 1502 includes means for activating one or more antenna panels for FD mode at one or more symbols prior to the FD symbols for the FD mode of the slot format pattern or means for activating a second antenna panel in response to the mode switch indication, the first antenna panel and the second antenna being configured for FD mode. The apparatus 1502 includes means for deactivating the second antenna panel after the time window indicated by the mode switch indication and means for deactivating the second antenna panel for the time window based on a length of the time window being greater than or equal to a threshold value. The apparatus 1502 includes means for communicating with the base station, in FD mode using one or more flexible symbols of the slot format pattern, using the slot format pattern that includes FD symbols for FD mode, in FD mode using the FD symbols, and in HD mode using the FD symbols as flexible symbols. The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
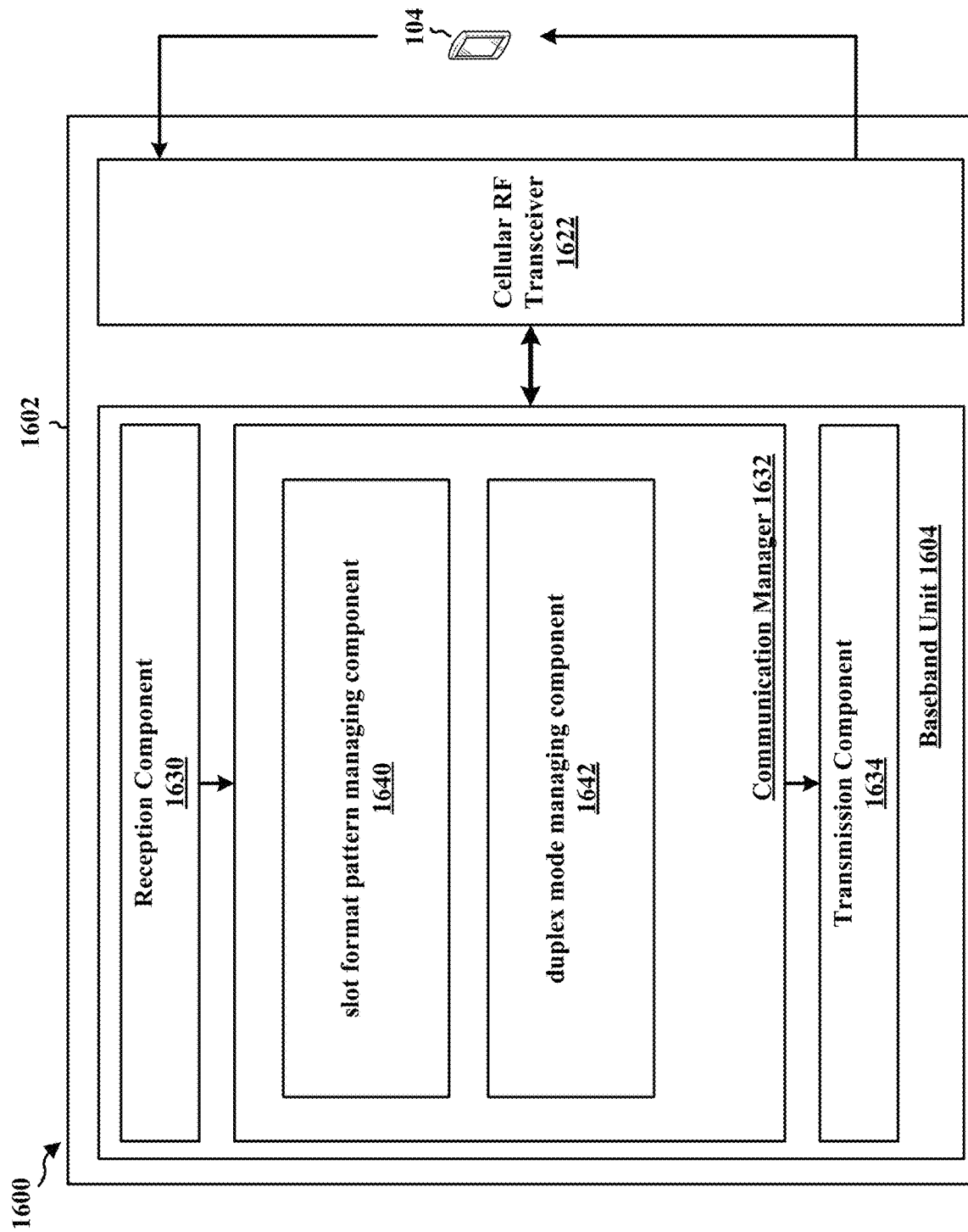
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a slot format pattern managing component 1640 that is configured to transmit a configuration for a slot format pattern that does not include an FD symbol for FD mode or a configuration for the slot format pattern including FD symbols for FD mode, e.g., as described in connection with 1302 and 1304. The communication manager 1632 further includes a duplex mode managing component 1642 that is configured to transmit a mode switch indication to switch from a first duplex mode to a second duplex mode, and communicate with the UE via one or more antenna panels in the second duplex mode based on the mode switch indication received, e.g., as described in connection with 1306, 1310, 1406, and 1410.

The apparatus may include additional components that perform each of the blocks of the algorithm in the flowcharts of FIGS. 10, 13, and 14. As such, each block in the flowcharts of FIGS. 10, 13, and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for transmitting, to a UE, a mode switch indication to switch from a first duplex mode to a second duplex mode, and means for communicating with the UE via one or more antenna panels in the second duplex mode based on the mode switch indication. The apparatus 1602 includes means for transmitting, to the UE, a configuration for a slot format pattern, that does not include at least one FD symbol for FD mode, and means for transmitting a configuration for a slot format pattern including FD symbols for FD mode. The apparatus 1602 includes means for communicating with the UE, in the second duplex mode based on the slot format pattern, and in HD mode using the FD symbols as flexible symbols. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

The disclosure of current application provides that a base station may transmit a mode switch indication to switch from a first duplex mode to a second duplex mode, and a UE may receive the mode switch indication. The UE and the base station may communicate via one or more antenna panels in the second duplex mode based on the mode switch indication. The mode switch indication may be transmitted in one or more of an RRC message, a MAC-CE, or DCI.

In some aspects, the mode switch indication may include a panel activation or deactivation indication. In one aspect, the current slot format pattern may not include FD symbols for FD mode. The first duplex mode may be HD mode and the second duplex mode may be FD mode, and the base station and the UE may communicate with each other in FD mode using one or more flexible symbols of the slot format pattern. The mode switch indication to switch from HD mode to FD mode may be received at a threshold number of symbols or slots prior to the one or more flexible symbols.

In another aspect, the current slot format pattern may include the FD symbols for FD mode. The first duplex mode may be FD mode and the second duplex mode may be HD mode, and the base station and the UE may communicate with each other in HD mode using the FD symbols as flexible symbols.

In some aspects, the mode switch indication may include a slot format pattern that includes one or more FD symbols for FD mode, and the communicating with the base station may include using the slot format pattern that includes FD symbols for FD mode. In one aspect, the first duplex mode may be HD mode and the second duplex mode may be FD mode, and the base station and the UE may communicate in FD mode using the FD symbols. In another aspect, UE may activate one or more antenna panels for FD mode at one or more symbols prior to the FD symbols for FD mode of the slot format pattern.

In some aspects, the mode switch indication may include a time duration indicating a time window for the UE to operate in the second duplex mode. In one aspect, the first duplex mode may be HD mode and the second duplex mode may be FD mode, and the one or more antenna panels may include a first antenna panel for HD mode. The UE may activate a second antenna panel in response to the mode switch indication, the first antenna panel and the second antenna being configured for FD mode. The UE may deactivate the second antenna panel after the time window indicated by the mode switch indication.

In another aspect, the first duplex mode may be FD mode and the second duplex mode may be HD mode, and the one or more antenna panels may include a first antenna panel and a second antenna panel for FD mode. The UE may deactivate the second antenna panel for the time window indicated by the mode switch indication. The UE may deactivate the second antenna panel for the time window based on a length of the time window being greater than or equal to a threshold value.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory, the at least one processer and the memory configured to receive, from a base station, a mode switch indication to switch from a first duplex mode to a second duplex mode, and communicate with the base station via the one or more antenna panels in the second duplex mode based on the mode switch indication.

Aspect 2 is the apparatus of aspect 1, further including a transceiver coupled to the at least one processor and one or more antenna panels.

Aspect 3 is the apparatus of any of aspects 1 and 2, wherein the mode switch indication includes a panel activation or deactivation indication.

Aspect 4 is the apparatus of any of aspects 1 to 3, wherein the mode switch indication is received in one or more of an RRC message, a MAC-CE, or DCI.

Aspect 5 is the apparatus of any of aspects 1 to 4, wherein the at least one processor and the memory are further configured to receive, from the base station, a configuration for a slot format pattern including at least one of one or more D symbols for DL transmission, one or more U symbols for UL transmission, or one or more F symbols for DL or UL transmission, wherein the communicating with the base station includes communicating with the base station in the second duplex mode based on the slot format pattern.

Aspect 6 is the apparatus of aspect 5, wherein the first duplex mode is HD mode and the second duplex mode is FD mode, and wherein the communicating with the base station further includes communicating with the base station in FD mode using the one or more F symbols of the slot format pattern.

Aspect 7 is the apparatus of aspect 6, wherein the mode switch indication to switch from HD mode to FD mode is received at a threshold number of symbols or slots prior to the one or more flexible symbols.

Aspect 8 is the apparatus of any of aspects 1 to 4, wherein the mode switch indication includes a slot format pattern that includes one or more FD symbols for FD mode, and the communicating with the base station includes using the slot format pattern that includes FD symbols for FD mode.

Aspect 9 is the apparatus of aspect 8, wherein the at least one processor and the memory are further configured to activate at least one antenna panel of the one or more antenna panels for FD mode at one or more symbols prior to the FD symbols for FD mode of the slot format pattern.

Aspect 10 is the apparatus of aspect 8, wherein the first duplex mode is HD mode and the second duplex mode is FD mode, and the communicating with the base station includes communicating with the base station in FD mode using the FD symbols.

Aspect 11 is the apparatus of any of aspects 1 to 4, wherein the at least one processor and the memory are further configured to receive a configuration for a slot format pattern including FD symbols for FD mode, wherein the mode switch indication indicates to the UE to switch from FD mode to HD mode, and wherein the communicating with the base station includes communicating with the base station in HD mode using the FD symbols as flexible symbols.

Aspect 12 is the apparatus of any of aspects 1 to 11, wherein the mode switch indication includes a time duration indicating a time window for the UE to operate in the second duplex mode.

Aspect 13 is the apparatus of aspect 12, wherein the first duplex mode is HD mode and the second duplex mode is FD mode, and the one or more antenna panels includes a first antenna panel for HD mode and a second antenna panel, and the at least one processor and the memory are further configured to activate the second antenna panel in response to the mode switch indication, the first antenna panel and the second antenna being configured for FD mode.

Aspect 14 is the apparatus of aspect 13, wherein the at least one processor and the memory are further configured to deactivate the second antenna panel after the time window indicated by the mode switch indication.

Aspect 15 is the apparatus of aspect 12, wherein the first duplex mode is FD mode and the second duplex mode is HD mode, and the one or more antenna panels includes a first antenna panel and a second antenna panel for FD mode, and the at least one processor and the memory are further configured to deactivate the second antenna panel for the time window indicated by the mode switch indication.

Aspect 16 is the apparatus of aspect 15, wherein deactivating the second antenna panel includes deactivating the second antenna panel for the time window based on a length of the time window being greater than or equal to a threshold value.

Aspect 17 is a method of wireless communication for implementing any of aspects 1 to 16.

Aspect 18 is an apparatus for wireless communication including means for implementing any of aspects 1 to 16.

Aspect 19 is a computer-readable medium storing computer executable code, where the code when executed by a processor causes the processor to implement any of aspects 1 to 16.

Aspect 20 is an apparatus for wireless communication at a base station including at least one processor coupled to a memory, the at least one processor and the memory configured to transmit, to a UE, a mode switch indication to switch from a first duplex mode to a second duplex mode, and communicate with the UE via one or more antenna panels in the second duplex mode based on the mode switch indication.

Aspect 21 is the apparatus of aspect 20, further including a transceiver coupled to the at least one processor.

Aspect 22 is the apparatus of any of aspects 20 and 21, wherein the mode switch indication includes a panel activation or deactivation indication.

Aspect 23 is the apparatus of any of aspects 20 to 22, wherein the mode switch indication is transmitted in one or more of an RRC message, a MAC-CE, or DCI.

Aspect 24 is the apparatus of any of aspects 20 to 23, wherein the at least one processor and the memory are further configured to transmit, to the UE, a configuration for a slot format pattern including at least one of one or more D symbols for DL transmission, one or more U symbols for UL transmission, or one or more F symbols for DL or UL transmission, and wherein the communicating with the UE includes communicating with the UE in the second duplex mode based on the slot format pattern.

Aspect 25 is the apparatus of aspect 24, wherein the first duplex mode is HD mode and the second duplex mode is FD mode, and the communicating with the UE further includes communicating with the UE in FD mode using the one or more F symbols of the slot format pattern.

Aspect 26 is the apparatus of aspect 25, wherein the mode switch indication to FD mode is transmitted at a threshold number of symbols prior to the one or more flexible symbols.

Aspect 27 is the apparatus of any of aspects 20 to 23, wherein the mode switch indication includes a slot format pattern that includes one or more FD symbols for FD mode, and the communicating with the UE includes communicating with the UE using the slot format pattern that includes FD symbols for FD mode.

Aspect 28 is the apparatus of aspect 27, wherein the first duplex mode is HD mode and the second duplex mode is FD mode, and the communicating with the UE includes communicating with the UE in FD mode using the FD symbols.

Aspect 29 is the apparatus of any of aspects 20 to 23, wherein the at least one processor and the memory are further configured to transmit a configuration for a slot format pattern including FD symbols for FD mode, wherein the mode switch indication indicates to the UE to switch from FD mode to HD mode, and wherein the communicating with the UE includes communicating with the UE in HD mode using the FD symbols as flexible symbols.

Aspect 30 is the apparatus of any of aspects any of aspects 20 to 23, wherein the mode switch indication includes a time duration indicating a time window to operate in the second duplex mode.

Aspect 31 is a method of wireless communication for implementing any of aspects 20 to 30.

Aspect 32 is an apparatus for wireless communication including means for implementing any of aspects 20 to 30.

Aspect 33 is a computer-readable medium storing computer executable code, where the code when executed by a processor causes the processor to implement any of aspects 20 to 30.

What is claimed is:

1. An apparatus for wireless communication at a user equipment (UE), comprising:
 a memory; and
 at least one processor coupled to the memory configured to:
  receive a time division duplex (TDD) pattern of resources including at least one resource for use in a first duplex mode or a second duplex mode;
  receive, from a network, a mode switch indication to switch from the first duplex mode to the second duplex mode for the at least one resource of the received TDD pattern; and
  communicate with the network via one or more antenna panels in the second duplex mode in the at least one resource of the received TDD pattern based on the mode switch indication.

2. The apparatus of claim 1, further comprising a transceiver coupled to the at least one processor and the one or more antenna panels,
 wherein the mode switch indication comprises a panel activation or deactivation indication.

3. The apparatus of claim 1, wherein the mode switch indication is comprised in one or more of a radio resource control (RRC) message, a medium access control-control element (MAC-CE), or downlink control information (DCI).

4. The apparatus of claim 1, wherein to receive the TDD pattern the at least one processor is further configured to receive, from the network, a configuration for a slot format pattern including at least one of one or more D symbols for downlink (DL) transmission, one or more U symbols for uplink (UL) transmission, or one or more flexible symbols (F symbols) for DL or UL transmission,
 wherein to communicate with the network, the at least one processor is configured to communicate with the network in the second duplex mode based on the slot format pattern.

5. The apparatus of claim 4, wherein the first duplex mode is a half-duplex (HD) mode and the second duplex mode is a full-duplex (FD) mode, and
 wherein to communicate with the network, the at least one processor is configured to communicate with the network in the FD mode using the one or more F symbols of the slot format pattern.

6. The apparatus of claim 5, wherein the mode switch indication to switch from the HD mode to the FD mode is received at a threshold number of symbols or slots prior to the one or more flexible symbols.

7. The apparatus of claim 1, wherein the mode switch indication comprises a slot format pattern that comprises at least one full-duplex (FD) symbol for a FD mode, and to communicate with the network, the at least one processor is configured to communicate with the network using the slot format pattern that comprises FD symbols for the FD mode.

8. The apparatus of claim 7, wherein the at least one processor is further configured to activate at least one antenna panel of the one or more antenna panels for the FD mode at one or more symbols prior to the FD symbols for the FD mode of the slot format pattern.

9. The apparatus of claim 7, wherein the first duplex mode is a half-duplex (HD) mode and the second duplex mode is the FD mode, and to communicate with the network the at least one processor is configured to communicate with the network, in the FD mode using the FD symbols.

10. The apparatus of claim 1, wherein to receive the TDD pattern, the at least one processor is further configured to receive a configuration for a slot format pattern comprising full-duplex (FD) symbols for a FD mode, wherein the mode switch indication indicates to the UE to switch from the FD mode to a half-duplex (HD) mode, and wherein to communicate with the network, the at least one processor is configured to communicate with the network in the HD mode using the FD symbols as flexible symbols.

11. The apparatus of claim 1, wherein the mode switch indication includes a time duration indicating a time window for the UE to operate in the second duplex mode.

12. The apparatus of claim 11, wherein the first duplex mode is a half-duplex (HD) mode and the second duplex mode is a full-duplex (FD) mode, and the one or more antenna panels comprises a first antenna panel for the HD mode and a second antenna panel, and
wherein the at least one processor is further configured to activate the second antenna panel in response to the mode switch indication, the first antenna panel and the second antenna being configured for the FD mode.

13. The apparatus of claim 12, wherein the at least one processor is further configured to deactivate the second antenna panel after the time window indicated by the mode switch indication.

14. The apparatus of claim 11, wherein the first duplex mode is a full-duplex (FD) mode and the second duplex mode is a half-duplex (HD) mode, and the one or more antenna panels comprises a first antenna panel and a second antenna panel for the FD mode, and
wherein the at least one processor is further configured to deactivate the second antenna panel for the time window indicated by the mode switch indication.

15. The apparatus of claim 14, wherein to deactivate the second antenna panel, the at least one processor is configured to deactivate the second antenna panel for a length of the time window based on the time window being greater than or equal to a threshold value.

16. A method of wireless communication at a user equipment (UE), comprising:
receiving a time division duplex (TDD) pattern of resources including at least one resource for use in a first duplex mode or a second duplex mode;
receiving, from a network, a mode switch indication to switch from the first duplex mode to the second duplex mode for the at least one resource of the received TDD pattern; and
communicating with the network via one or more antenna panels in the second duplex mode in the at least one resource of the received TDD pattern based on the mode switch indication.

17. The method of claim 16, wherein receiving the TDD pattern includes:
receiving, from the network, a configuration for a slot format pattern including at least one of one or more D symbols for downlink (DL) transmission, one or more U symbols for uplink (UL) transmission, or one or more flexible symbols (F symbols) for DL or UL transmission,
wherein the communicating with the network further comprises communicating with the network in the second duplex mode based on the slot format pattern.

18. The method of claim 16, wherein the mode switch indication comprises a slot format pattern that comprises at least one full-duplex (FD) symbol for a FD mode, and the communicating with the network comprises communicating with the network using the slot format pattern that comprises FD symbols for the FD mode, and the method further comprising:

activating at least one antenna panel of the one or more antenna panels for the FD mode at one or more symbols prior to the FD symbols for the FD mode of the slot format pattern.

19. The method of claim 16, wherein receiving the TDD pattern includes:
receiving a configuration for a slot format pattern comprising full-duplex (FD) symbols for a FD mode, wherein the mode switch indication indicates to the UE to switch from the FD mode to a half-duplex (HD) mode,
wherein the communicating with the network comprises communicating with the network in the HD mode using the FD symbols as flexible symbols.

20. An apparatus for wireless communication at a network, comprising:
a memory; and
at least one processor coupled to the memory and configured to:
provide a time division duplex (TDD) pattern of resources, the TDD pattern including at least one resource for use in a first duplex mode or a second duplex mode;
provide, for a user equipment (UE), a mode switch indication to switch from the first duplex mode to the second duplex mode for the at least one resource of the provided TDD pattern; and
communicate with one or more antenna panels of the UE in the second duplex mode in the at least one resource of the provided TDD pattern based on the mode switch indication.

21. The apparatus of claim 20, further comprising a transceiver coupled to the at least one processor,
wherein the mode switch indication comprises a panel activation or deactivation indication.

22. The apparatus of claim 20, wherein the mode switch indication is comprised in one or more of a radio resource control (RRC) message, a medium access control-control element (MAC-CE), or downlink control information (DCI).

23. The apparatus of claim 20, wherein to provide the TDD pattern, the at least one processor is further configured to provide, for the UE, a configuration for a slot format pattern including at least one of one or more D symbols for downlink (DL) transmission, one or more U symbols for uplink (UL) transmission, or one or more flexible symbols (F symbols) for DL or UL transmission,
wherein to communicate with the UE, the at least one processor is configured to communicate with the UE in the second duplex mode based on the slot format pattern.

24. The apparatus of claim 23, wherein the first duplex mode is a half-duplex (HD) mode and the second duplex mode is a full-duplex (FD) mode, and
wherein to communicate with the UE, the at least one processor is configured to communicate with the UE in the FD mode using the one or more F symbols of the slot format pattern.

25. The apparatus of claim 24, wherein the mode switch indication to the FD mode is transmitted at a threshold number of symbols prior to the one or more flexible symbols.

26. The apparatus of claim 20, wherein the mode switch indication comprises a slot format pattern that comprises at least one full-duplex (FD) symbol for a FD mode, and to communicate with the UE, the at least one processor is configured to communicate with the UE using the slot format pattern that comprises FD symbols for the FD mode.

27. The apparatus of claim 26, wherein the first duplex mode is a half-duplex (HD) mode and the second duplex mode is the FD mode, and to communicate with the UE, the at least one processor is configured to communicate with the UE in the FD mode using the FD symbols.

28. The apparatus of claim 20, wherein to provide the TDD pattern the at least one processor is further configured to provide a configuration for a slot format pattern comprising full-duplex (FD) symbols for a FD mode,
wherein the mode switch indication indicates to the UE to switch from the FD mode to a half-duplex (HD) mode, and
wherein to communicate with the UE, the at least one processor is configured to communicate with the UE in the HD mode using the FD symbols as flexible symbols.

29. The apparatus of claim 20, wherein the mode switch indication includes a time duration indicating a time window to operate in the second duplex mode.

30. A method of wireless communication at a network device, comprising:
providing a time division duplex (TDD) pattern of resources, the TDD pattern including at least one resource for use in a first duplex mode or a second duplex mode;
providing, for a user equipment (UE), a mode switch indication to switch from the first duplex mode to the second duplex mode for the at least one resource of the provided TDD pattern; and
communicating with one or more antenna panels of the UE in the second duplex mode in the at least one resource of the provided TDD pattern based on the mode switch indication.

31. The method of claim 30, wherein the mode switch indication is comprised in one or more of a radio resource control (RRC) message, a medium access control-control element (MAC-CE), or downlink control information (DCI), and the mode switch indication comprises a panel activation or deactivation indication.

32. The method of claim 30, wherein providing the TDD pattern includes providing, for the UE, a configuration for a slot format pattern including at least one of one or more D symbols for downlink (DL) transmission, one or more U symbols for uplink (UL) transmission, or one or more flexible symbols (F symbols) for DL or UL transmission,
wherein the first duplex mode is a half-duplex (HD) mode and the second duplex mode is a full-duplex (FD) mode, and communicating with the UE includes communicating with the UE in the FD mode using the one or more F symbols of the slot format pattern.

33. The method of claim 30, wherein providing the TDD pattern includes providing a configuration for a slot format pattern comprising full-duplex (FD) symbols for a FD mode,
wherein the mode switch indication indicates to the UE to switch from the FD mode to a half-duplex (HD) mode, and
wherein communicating with the UE comprises communicating with the UE in the HD mode using the FD symbols as flexible symbols.

34. A non-transitory computer-readable storage medium storing computer executable code at a user equipment (UE), the code when executed by a processor causes the processor to:
receive a time division duplex (TDD) pattern of resources including at least one resource for use in a first duplex mode or a second duplex mode;
receive, from a network, a mode switch indication to switch from the first duplex mode to the second duplex mode for the at least one resource of the received TDD pattern; and
communicate with the network via one or more antenna panels in the second duplex mode in the at least one resource of the received TDD pattern based on the mode switch indication.

35. The non-transitory computer-readable storage medium of claim 34, wherein the mode switch indication is comprised in one or more of a radio resource control (RRC) message, a medium access control-control element (MAC-CE), or downlink control information (DCI), and the mode switch indication comprises a panel activation or deactivation indication.

36. The non-transitory computer-readable storage medium of claim 34, wherein the TDD pattern corresponds to a slot format pattern, the computer-readable medium further comprising code when executed by the processor causes the processor to:
receive, from the network, a configuration for the slot format pattern including at least one of one or more D symbols for downlink (DL) transmission, one or more U symbols for uplink (UL) transmission, or one or more flexible symbols (F symbols) for DL or UL transmission, wherein the first duplex mode is a half-duplex (HD) mode and the second duplex mode is a full-duplex (FD) mode, and communicate with the network in the FD mode using the one or more F symbols of the slot format pattern.

37. The non-transitory computer-readable storage medium of claim 34, wherein to receive the TDD pattern, computer-readable medium further comprising code when executed by the processor causes the processor to receive a configuration for a slot format pattern comprising full-duplex (FD) symbols for a FD mode, wherein the mode switch indication indicates to the UE to switch from the FD mode to a half-duplex (HD) mode, and communicate with the network in the HD mode using the FD symbols as flexible symbols.

38. A non-transitory computer-readable storage medium storing computer executable code at a network, the code when executed by a processor causes the processor to:
provide a time division duplex (TDD) pattern of resources, the TDD pattern including at least one resource for use in a first duplex mode or a second duplex mode;
provide, for a user equipment (UE), a mode switch indication to switch from the first duplex mode to the second duplex mode for the at least one resource of the provided TDD pattern; and
communicate with one or more antenna panels of the UE in the second duplex mode in the at least one resource of the provided TDD pattern based on the mode switch indication.

39. The non-transitory computer-readable storage medium of claim 38, wherein the mode switch indication is comprised in one or more of a radio resource control (RRC) message, a medium access control-control element (MAC-CE), or downlink control information (DCI), and the mode switch indication comprises a panel activation or deactivation indication.

40. The non-transitory computer-readable storage medium of claim 38, wherein to provide the TDD pattern, the computer-readable medium further comprises code when executed by the processor causes the processor to provide, for the UE, a configuration for a slot format pattern including at least one of one or more D symbols for downlink (DL) transmission, one or more U symbols for uplink (UL) transmission, or one or more flexible symbols (F symbols) for DL or UL transmission, wherein the first duplex mode is a half-duplex (HD) mode and the second duplex mode is a full-duplex (FD) mode, and to communicate with the UE, to communicate with the UE, the computer-readable medium further comprises code when executed by the processor causes the processor to communicate with the UE in the FD mode using the one or more F symbols of the slot format pattern.

41. The non-transitory computer-readable storage medium of claim 38, wherein to provide the TDD pattern the computer-readable medium further comprises code when executed by the processor causes the processor to provide a configuration for a slot format pattern comprising full-duplex (FD) symbols for a FD mode, wherein the mode switch indication indicates to the UE to switch from the FD mode to a half-duplex (HD) mode, and wherein to communicate with the UE, the computer-readable medium further comprises code when executed by the processor causes the processor to communicate with the UE in the HD mode using the FD symbols as flexible symbols.

* * * * *